(12) United States Patent
Zhu et al.

(10) Patent No.: US 11,385,443 B2
(45) Date of Patent: Jul. 12, 2022

(54) OPTICAL IMAGING LENS

(71) Applicant: GENIUS ELECTRONIC OPTICAL (XIAMEN) CO., LTD., Fujian (CN)

(72) Inventors: Qingzhi Zhu, Fujian (CN); Ou Zhou, Fujian (CN); Huabin Liao, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 338 days.

(21) Appl. No.: 16/801,163

(22) Filed: Feb. 26, 2020

(65) Prior Publication Data

US 2021/0149161 A1 May 20, 2021

(30) Foreign Application Priority Data

Nov. 14, 2019 (CN) .......................... 201911111733.1

(51) Int. Cl.
*G02B 13/00* (2006.01)
*G02B 9/64* (2006.01)
*G02B 27/00* (2006.01)
*H04N 5/225* (2006.01)

(52) U.S. Cl.
CPC .......... *G02B 13/0045* (2013.01); *G02B 9/64* (2013.01); *G02B 27/0025* (2013.01); *H04N 5/2254* (2013.01)

(58) Field of Classification Search
CPC ........ G02B 3/04; G02B 9/64; G02B 13/0045; G02B 27/0025; H04N 5/2254
See application file for complete search history.

*Primary Examiner* — Jack Dinh
(74) *Attorney, Agent, or Firm* — JCIPRNET

(57) ABSTRACT

An optical imaging lens including a first lens element, a second lens element, a third lens element, a fourth lens element, a fifth lens element, a sixth lens element and a seventh lens element sequentially along an optical axis from an object-side to an image-side is provided. The optical imaging lens satisfies the condition expression of $(G67+T7)/(T1+T2) \geq 1.600$, wherein G67 is an air gap from the sixth lens element to the seventh lens element along the optical axis, T1 is a thickness of the first lens element along the optical axis, T2 is a thickness of the second lens element along the optical axis, and T7 is a thickness of the seventh lens element along the optical axis.

20 Claims, 33 Drawing Sheets

| First embodiment ||||||
|---|---|---|---|---|---|
| EFL=4.393 mm, HFOV=43.546°, TTL=5.459 mm, Fno=1.580, ImgH=4.500 mm ||||||
| Element | Surface | Radius of curvature (mm) | Thickness (mm) | Refractive index | Abbe number | Focal length (mm) |
| Object | | Infinity | Infinity | | | |
| Aperture stop 0 | | Infinity | -0.171 | | | |
| First lens element 1 | Object-side surface 15 | 2.584 | 0.482 | 1.544 | 55.951 | 8.160 |
| | Image-side surface 16 | 5.752 | 0.013 | | | |
| Second lens element 2 | Object-side surface 25 | 2.632 | 0.183 | 1.671 | 19.243 | -17.622 |
| | Image-side surface 26 | 2.096 | 0.130 | | | |
| Third lens element 3 | Object-side surface 35 | 3.265 | 0.760 | 1.544 | 55.951 | 6.908 |
| | Image-side surface 36 | 22.375 | 0.355 | | | |
| Fourth lens element 4 | Object-side surface 45 | 15.300 | 0.383 | 1.544 | 55.951 | 61.749 |
| | Image-side surface 46 | 27.777 | 0.457 | | | |
| Fifth lens element 5 | Object-side surface 55 | 58.559 | 0.388 | 1.671 | 19.243 | -14.374 |
| | Image-side surface 56 | 8.328 | 0.050 | | | |
| Sixth lens element 6 | Object-side surface 65 | 2.374 | 0.476 | 1.544 | 55.951 | 14.602 |
| | Image-side surface 66 | 3.141 | 0.475 | | | |
| Seventh lens element 7 | Object-side surface 75 | 2.382 | 0.589 | 1.544 | 55.951 | -11.008 |
| | Image-side surface 76 | 1.556 | 0.406 | | | |
| Filter 9 | Object-side surface 95 | Infinity | 0.200 | 1.560 | 51.300 | |
| | Image-side surface 96 | Infinity | 0.112 | | | |
| | Image plane 99 | Infinity | | | | |

Figure 8

| Surface | K | $a_4$ | $a_6$ | $a_8$ | $a_{10}$ |
|---|---|---|---|---|---|
| 15 | -3.800474E+00 | 8.773511E-03 | -1.258399E-02 | -6.082128E-03 | -1.281258E-03 |
| 16 | -3.014625E+01 | -3.437705E-02 | -2.143244E-02 | 1.364447E-02 | -4.096198E-03 |
| 25 | -9.146763E+00 | 2.268661E-03 | -3.207780E-02 | 2.878824E-02 | -5.380685E-03 |
| 26 | -4.454367E+00 | 3.145364E-02 | -3.266874E-02 | 3.244312E-02 | -1.323117E-02 |
| 35 | -2.575460E+00 | 2.045281E-02 | -8.909440E-05 | 9.892236E-03 | -5.262773E-03 |
| 36 | -4.098470E+02 | 8.569886E-03 | -6.077682E-03 | 6.432613E-03 | -2.722549E-03 |
| 45 | -1.096897E+02 | -1.040186E-02 | -6.170520E-03 | -4.725568E-03 | 4.558509E-03 |
| 46 | -1.070988E+09 | -1.835201E-02 | 3.753503E-05 | -1.256634E-02 | 8.345160E-03 |
| 55 | -7.278646E+02 | -8.461817E-03 | 2.029745E-02 | -4.531293E-02 | 2.647364E-02 |
| 56 | -2.622769E+02 | -1.612544E-02 | 2.830405E-02 | -3.753541E-02 | 1.864005E-02 |
| 65 | -8.453605E+00 | -4.660543E-03 | -5.408072E-03 | -5.895776E-03 | 1.888072E-03 |
| 66 | -8.179937E-01 | -1.330989E-02 | -3.961758E-03 | -2.617729E-03 | 1.554297E-03 |
| 75 | -1.720831E+01 | -4.537113E-02 | -2.335687E-02 | 1.690088E-02 | -4.632665E-03 |
| 76 | -4.914001E+00 | -4.200463E-02 | 8.320001E-03 | -9.637318E-04 | 3.390627E-05 |
| Surface | $a_{12}$ | $a_{14}$ | $a_{16}$ | $a_{18}$ | $a_{20}$ |
| 15 | 1.036079E-03 | 4.134903E-04 | -1.723716E-04 | | |
| 16 | 8.358624E-04 | -2.487226E-04 | 3.869470E-05 | | |
| 25 | -8.720854E-04 | -5.697115E-04 | 2.602155E-04 | | |
| 26 | -1.398177E-03 | 1.631486E-03 | -2.607753E-04 | | |
| 35 | 7.986988E-04 | 2.508590E-04 | -5.060713E-05 | | |
| 36 | 4.936465E-04 | 4.963716E-04 | 2.986137E-06 | | |
| 45 | -2.465061E-03 | 1.640735E-04 | 6.148682E-05 | 5.061783E-05 | 3.311234E-06 |
| 46 | -2.479073E-03 | 1.311085E-04 | -1.117501E-05 | 5.177939E-06 | 1.735842E-05 |
| 55 | -8.458424E-03 | 1.007572E-03 | -2.618169E-05 | 2.342226E-05 | -1.049607E-05 |
| 56 | -5.274142E-03 | 8.433114E-04 | -6.793326E-05 | 3.678152E-06 | -2.867721E-07 |
| 65 | -4.687500E-04 | 9.461490E-05 | -2.795417E-06 | -3.928322E-07 | -2.976292E-07 |
| 66 | -3.023705E-04 | 2.581333E-05 | -8.693973E-07 | 4.360042E-08 | -5.197764E-09 |
| 75 | 7.308867E-04 | -6.873351E-05 | 3.470112E-06 | -6.920716E-08 | -7.317800E-11 |
| 76 | 3.221582E-06 | -3.536516E-07 | 1.333019E-08 | -1.874880E-10 | -2.964000E-12 |

Figure 9

| Second embodiment | | | | | | |
|---|---|---|---|---|---|---|
| EFL=3.884 mm, HFOV=44.262°, TTL=5.220 mm, Fno=1.580, ImgH=4.500 mm | | | | | | |
| Element | Surface | Radius of curvature (mm) | Thickness (mm) | Refractive index | Abbe number | Focal length (mm) |
| Object | | Infinity | Infinity | | | |
| Aperture stop 0 | | Infinity | -0.156 | | | |
| First lens element 1 | Object-side surface 15 | 2.535 | 0.498 | 1.544 | 55.951 | 7.857 |
| | Image-side surface 16 | 5.774 | 0.074 | | | |
| Second lens element 2 | Object-side surface 25 | 2.511 | 0.096 | 1.671 | 19.243 | -20.363 |
| | Image-side surface 26 | 2.091 | 0.209 | | | |
| Third lens element 3 | Object-side surface 35 | 3.428 | 0.540 | 1.544 | 55.951 | 7.842 |
| | Image-side surface 36 | 16.277 | 0.452 | | | |
| Fourth lens element 4 | Object-side surface 45 | 12.130 | 0.316 | 1.544 | 55.951 | 24.895 |
| | Image-side surface 46 | 112.199 | 0.460 | | | |
| Fifth lens element 5 | Object-side surface 55 | 12.802 | 0.263 | 1.671 | 19.243 | -13.443 |
| | Image-side surface 56 | 5.278 | 0.088 | | | |
| Sixth lens element 6 | Object-side surface 65 | 1.919 | 0.348 | 1.544 | 55.951 | 10.851 |
| | Image-side surface 66 | 2.658 | 0.523 | | | |
| Seventh lens element 7 | Object-side surface 75 | 1.594 | 0.475 | 1.544 | 55.951 | -13.535 |
| | Image-side surface 76 | 1.173 | 0.566 | | | |
| Filter 9 | Object-side surface 95 | Infinity | 0.200 | 1.560 | 51.300 | |
| | Image-side surface 96 | Infinity | 0.112 | | | |
| | Image plane 99 | Infinity | | | | |

Figure 12

| Surface | K | $a_4$ | $a_6$ | $a_8$ | $a_{10}$ |
|---|---|---|---|---|---|
| 15 | -4.800171E+00 | 7.097397E-03 | -1.277406E-02 | -5.858927E-03 | -8.846217E-04 |
| 16 | -3.708161E+01 | -3.450147E-02 | -2.140216E-02 | 1.382334E-02 | -4.027169E-03 |
| 25 | -7.605592E+00 | 5.262030E-03 | -3.320371E-02 | 2.737595E-02 | -5.905245E-03 |
| 26 | -4.226817E+00 | 3.134697E-02 | -3.416700E-02 | 3.183816E-02 | -1.385249E-02 |
| 35 | -4.020896E+00 | 1.783133E-02 | -1.094798E-03 | 9.910403E-03 | -5.143324E-03 |
| 36 | -1.654745E+02 | 1.708349E-03 | -1.102075E-02 | 6.356823E-03 | -2.364526E-03 |
| 45 | -8.338213E+01 | -7.312833E-03 | -8.498403E-03 | -6.501673E-03 | 4.183686E-03 |
| 46 | 1.023491E+03 | -1.162828E-02 | -2.440610E-03 | -1.295384E-02 | 8.440438E-03 |
| 55 | 5.810123E+01 | -3.762551E-03 | 2.129729E-02 | -4.701969E-02 | 2.616864E-02 |
| 56 | -1.008190E+02 | -8.720159E-03 | 2.789810E-02 | -3.770955E-02 | 1.861510E-02 |
| 65 | -6.107517E+00 | -6.712069E-03 | -5.323949E-03 | -5.256156E-03 | 2.024289E-03 |
| 66 | -1.155284E+00 | -1.612701E-02 | -4.542573E-03 | -2.650260E-03 | 1.556472E-03 |
| 75 | -1.223332E+01 | -5.369954E-02 | -2.346510E-02 | 1.688908E-02 | -4.631812E-03 |
| 76 | -5.389801E+00 | -4.059379E-02 | 7.622655E-03 | -9.736271E-04 | 3.586054E-05 |
| Surface | $a_{12}$ | $a_{14}$ | $a_{16}$ | $a_{18}$ | $a_{20}$ |
| 15 | 1.276047E-03 | 4.406549E-04 | -2.485775E-04 | | |
| 16 | 9.384922E-04 | -2.134833E-04 | -3.400443E-06 | | |
| 25 | -1.072411E-03 | -6.109049E-04 | 2.663245E-04 | | |
| 26 | -1.601626E-03 | 1.625779E-03 | -2.353064E-04 | | |
| 35 | 7.060840E-04 | 1.864210E-04 | 2.841934E-06 | | |
| 36 | 3.944967E-04 | 3.065516E-04 | -7.297952E-05 | | |
| 45 | -2.495532E-03 | 1.659717E-04 | 2.929817E-05 | 1.363832E-05 | -1.950291E-05 |
| 46 | -2.477470E-03 | 1.074899E-04 | -1.680002E-05 | 2.648226E-06 | 1.617622E-05 |
| 55 | -8.224042E-03 | 1.092032E-03 | -2.533246E-05 | 1.615918E-05 | -1.075494E-05 |
| 56 | -5.290892E-03 | 8.405582E-04 | -6.808015E-05 | 3.700649E-06 | -2.436613E-07 |
| 65 | -4.702575E-04 | 8.208819E-05 | -6.226800E-06 | -5.885424E-07 | 1.121968E-08 |
| 66 | -3.022832E-04 | 2.574822E-05 | -8.931551E-07 | 4.020599E-08 | -5.243958E-09 |
| 75 | 7.308860E-04 | -6.876572E-05 | 3.466792E-06 | -6.963252E-08 | -1.416200E-10 |
| 76 | 3.439951E-06 | -3.397532E-07 | 1.368952E-08 | -2.573400E-10 | -2.177900E-11 |

Figure 13

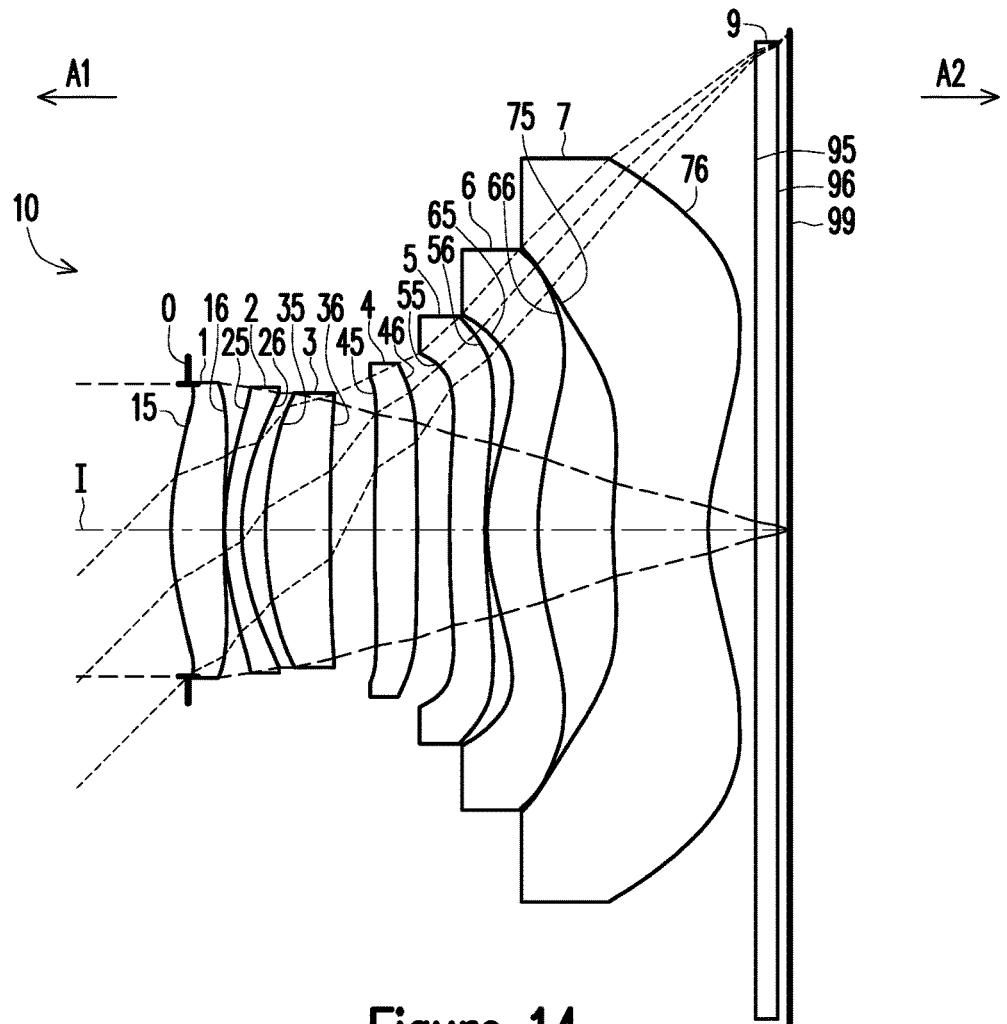
Figure 14
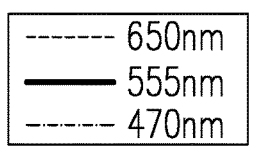
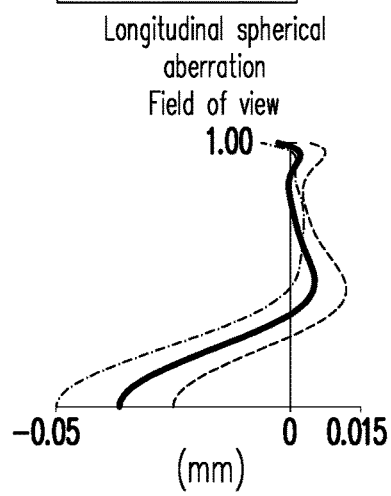
Figure 15A
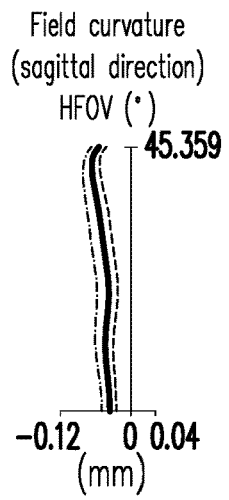
Figure 15B
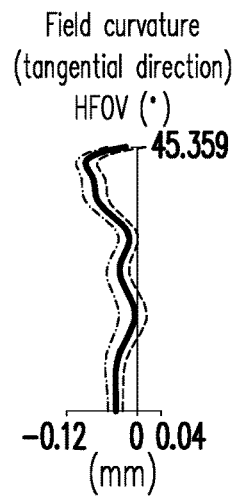
Figure 15C
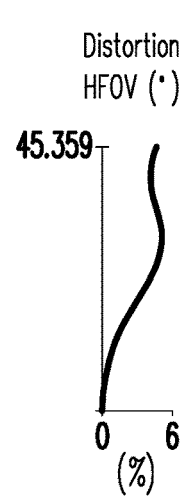
Figure 15D

| Third embodiment |||||||
|---|---|---|---|---|---|---|
| EFL=4.191 mm, HFOV=45.359°, TTL=5.570 mm, Fno=1.580, ImgH=4.500 mm |||||||
| Element | Surface | Radius of curvature (mm) | Thickness (mm) | Refractive index | Abbe number | Focal length (mm) |
| Object | | Infinity | Infinity | | | |
| Aperture stop 0 | | Infinity | -0.145 | | | |
| First lens element 1 | Object-side surface 15 | 2.697 | 0.465 | 1.544 | 55.951 | 8.505 |
| | Image-side surface 16 | 6.048 | 0.007 | | | |
| Second lens element 2 | Object-side surface 25 | 2.334 | 0.157 | 1.671 | 19.243 | -19.935 |
| | Image-side surface 26 | 1.936 | 0.216 | | | |
| Third lens element 3 | Object-side surface 35 | 3.462 | 0.584 | 1.544 | 55.951 | 7.678 |
| | Image-side surface 36 | 18.736 | 0.399 | | | |
| Fourth lens element 4 | Object-side surface 45 | 14.106 | 0.379 | 1.544 | 55.951 | 40.599 |
| | Image-side surface 46 | 38.458 | 0.298 | | | |
| Fifth lens element 5 | Object-side surface 55 | 12.832 | 0.317 | 1.671 | 19.243 | -12.612 |
| | Image-side surface 56 | 5.078 | 0.019 | | | |
| Sixth lens element 6 | Object-side surface 65 | 1.923 | 0.461 | 1.544 | 55.951 | 8.586 |
| | Image-side surface 66 | 2.987 | 0.674 | | | |
| Seventh lens element 7 | Object-side surface 75 | 4.271 | 0.861 | 1.544 | 55.951 | -7.855 |
| | Image-side surface 76 | 1.991 | 0.422 | | | |
| Filter 9 | Object-side surface 95 | Infinity | 0.200 | 1.560 | 51.300 | |
| | Image-side surface 96 | Infinity | 0.112 | | | |
| | Image plane 99 | Infinity | | | | |

Figure 16

| Surface | K | $a_4$ | $a_6$ | $a_8$ | $a_{10}$ |
|---|---|---|---|---|---|
| 15 | -4.644555E+00 | 6.904282E-03 | -1.333059E-02 | -6.179086E-03 | -1.052957E-03 |
| 16 | -3.821645E+01 | -3.448501E-02 | -2.146519E-02 | 1.363381E-02 | -4.202033E-03 |
| 25 | -7.587425E+00 | 6.111248E-03 | -3.242737E-02 | 2.770019E-02 | -5.828137E-03 |
| 26 | -4.184260E+00 | 3.150233E-02 | -3.403349E-02 | 3.213054E-02 | -1.355441E-02 |
| 35 | -4.252511E+00 | 1.738043E-02 | -1.216361E-03 | 9.916820E-03 | -5.062593E-03 |
| 36 | -6.450166E+01 | 3.856470E-03 | -9.549491E-03 | 6.660818E-03 | -2.367972E-03 |
| 45 | -1.859620E+02 | -3.129228E-03 | -4.445734E-03 | -5.231897E-03 | 4.487276E-03 |
| 46 | -1.184216E+04 | -1.371149E-02 | -1.469686E-03 | -1.263774E-02 | 8.522099E-03 |
| 55 | 6.008293E+01 | -2.670844E-03 | 2.197184E-02 | -4.672910E-02 | 2.631280E-02 |
| 56 | -6.514918E+01 | -9.460987E-03 | 2.932168E-02 | -3.751915E-02 | 1.862804E-02 |
| 65 | -7.137032E+00 | -4.915555E-03 | -6.404487E-03 | -5.642666E-03 | 1.974514E-03 |
| 66 | -1.136425E+00 | -1.590402E-02 | -4.510482E-03 | -2.641685E-03 | 1.558647E-03 |
| 75 | -5.079250E+01 | -5.121472E-02 | -2.331646E-02 | 1.689741E-02 | -4.630326E-03 |
| 76 | -4.982515E+00 | -3.886035E-02 | 7.616199E-03 | -9.889133E-04 | 3.405291E-05 |
| Surface | $a_{12}$ | $a_{14}$ | $a_{16}$ | $a_{18}$ | $a_{20}$ |
| 15 | 1.222490E-03 | 4.419817E-04 | -2.278296E-04 |  |  |
| 16 | 8.411864E-04 | -2.325145E-04 | 2.948578E-05 |  |  |
| 25 | -1.041228E-03 | -5.638069E-04 | 3.303302E-04 |  |  |
| 26 | -1.421559E-03 | 1.699484E-03 | -2.228090E-04 |  |  |
| 35 | 7.569390E-04 | 1.718140E-04 | -2.629881E-05 |  |  |
| 36 | 3.696773E-04 | 3.003164E-04 | -6.971377E-05 |  |  |
| 45 | -2.413783E-03 | 2.039531E-04 | 5.337109E-05 | 2.859019E-05 | -1.105937E-05 |
| 46 | -2.463559E-03 | 1.050360E-04 | -2.087062E-05 | -9.576547E-08 | 1.471720E-05 |
| 55 | -8.205602E-03 | 1.079412E-03 | -3.360053E-05 | 1.298693E-05 | -1.178701E-05 |
| 56 | -5.290780E-03 | 8.403395E-04 | -6.815650E-05 | 3.679617E-06 | -2.488823E-07 |
| 65 | -4.673672E-04 | 8.454990E-05 | -5.567401E-06 | -4.197274E-07 | 5.799155E-08 |
| 66 | -3.018180E-04 | 2.583901E-05 | -8.780336E-07 | 4.197152E-08 | -5.139794E-09 |
| 75 | 7.310851E-04 | -6.874227E-05 | 3.468785E-06 | -6.959828E-08 | -1.749020E-10 |
| 76 | 3.310731E-06 | -3.431417E-07 | 1.417289E-08 | -1.692710E-10 | -1.226100E-11 |

Figure 17

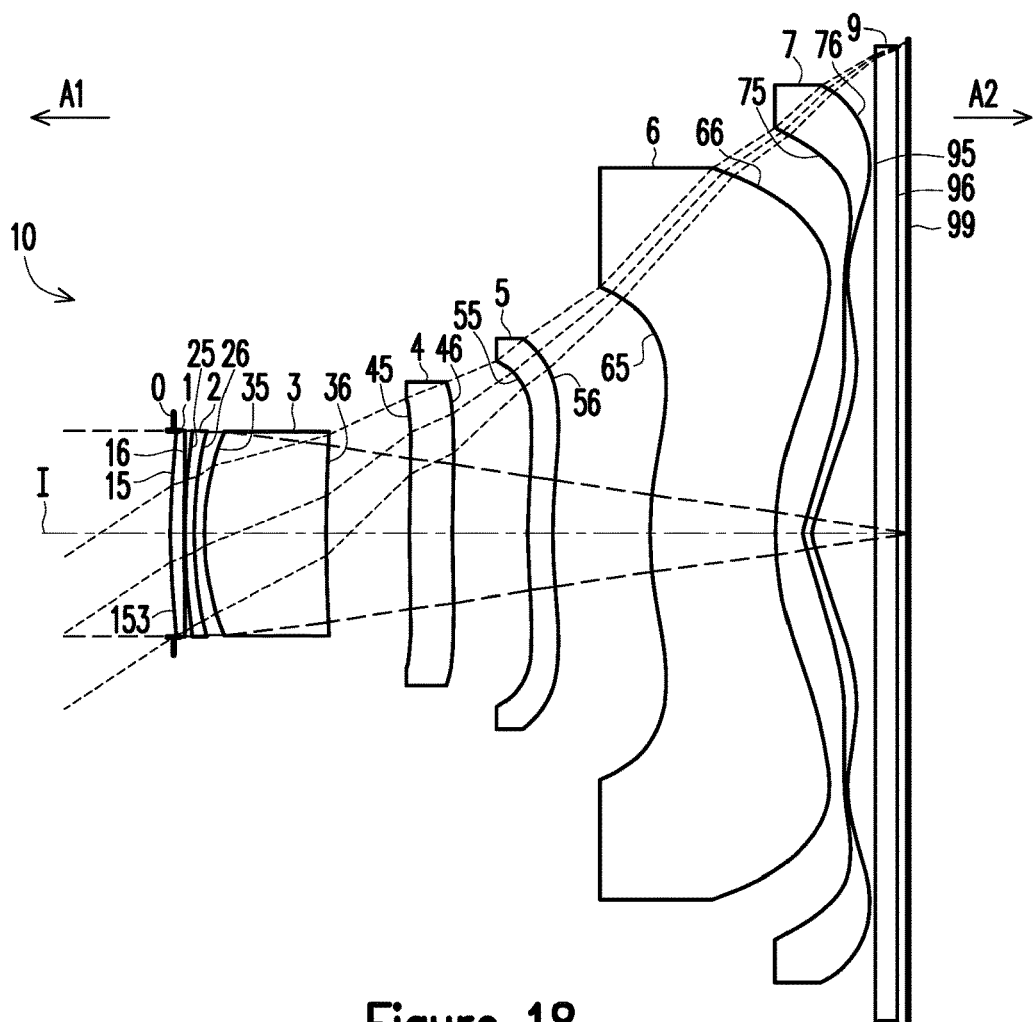
Figure 18
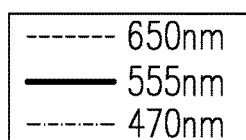
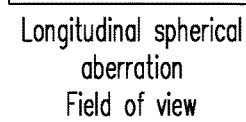
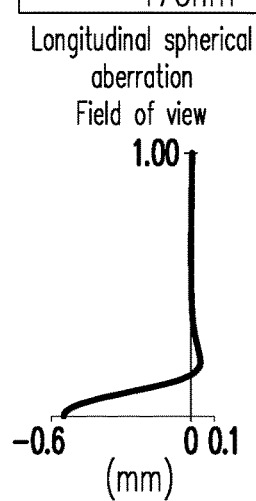
Figure 19A
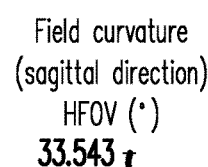
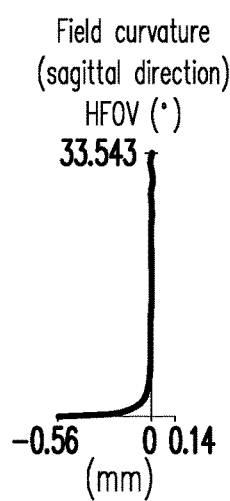
Figure 19B
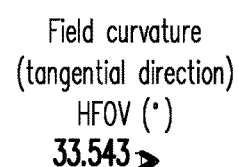
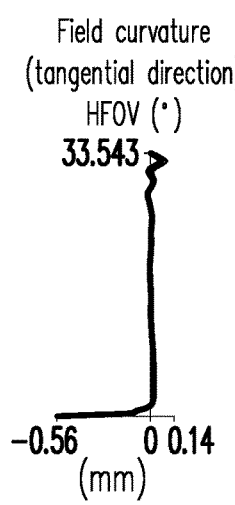
Figure 19C
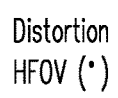
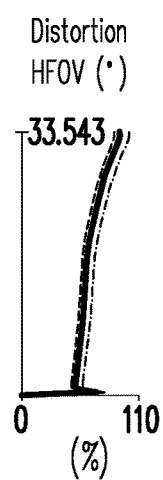
Figure 19D

| Fourth embodiment | | | | | | |
|---|---|---|---|---|---|---|
| EFL=2.967 mm, HFOV=33.543°, TTL=6.708 mm, Fno=1.580, ImgH=4.500 mm | | | | | | |
| Element | Surface | Radius of curvature (mm) | Thickness (mm) | Refractive index | Abbe number | Focal length (mm) |
| Object | | Infinity | Infinity | | | |
| Aperture stop 0 | | Infinity | -0.030 | | | |
| First lens element 1 | Object-side surface 15 | 5.442 | 0.122 | 1.544 | 55.951 | 19.103 |
| | Image-side surface 16 | 11.296 | 0.010 | | | |
| Second lens element 2 | Object-side surface 25 | 5.988 | 0.080 | 1.671 | 19.243 | -14.894 |
| | Image-side surface 26 | 3.738 | 0.098 | | | |
| Third lens element 3 | Object-side surface 35 | 2.485 | 1.102 | 1.544 | 55.951 | 5.465 |
| | Image-side surface 36 | 12.577 | 0.761 | | | |
| Fourth lens element 4 | Object-side surface 45 | 14.943 | 0.391 | 1.544 | 55.951 | 75.519 |
| | Image-side surface 46 | 23.227 | 0.683 | | | |
| Fifth lens element 5 | Object-side surface 55 | 6.894 | 0.224 | 1.671 | 19.243 | -30.619 |
| | Image-side surface 56 | 5.106 | 0.889 | | | |
| Sixth lens element 6 | Object-side surface 65 | 3.370 | 1.141 | 1.544 | 55.951 | -192.670 |
| | Image-side surface 66 | 2.875 | 0.244 | | | |
| Seventh lens element 7 | Object-side surface 75 | 0.071 | 0.080 | 1.544 | 55.951 | 4.203 |
| | Image-side surface 76 | 0.044 | 0.580 | | | |
| Filter 9 | Object-side surface 95 | Infinity | 0.200 | 1.560 | 51.300 | |
| | Image-side surface 96 | Infinity | 0.103 | | | |
| | Image plane 99 | Infinity | | | | |

Figure 20

| Surface | K | $a_4$ | $a_6$ | $a_8$ | $a_{10}$ |
|---|---|---|---|---|---|
| 15 | -7.818529E+00 | -2.610517E-02 | 1.189546E-02 | -2.933691E-02 | 1.308245E-02 |
| 16 | -1.777554E+01 | -4.399032E-02 | 7.939271E-02 | -1.482846E-01 | 1.159507E-01 |
| 25 | -6.205229E+00 | -1.545749E-02 | 9.832135E-03 | 1.210103E-01 | -2.905303E-01 |
| 26 | -5.223000E+00 | 1.414117E-03 | -4.624460E-02 | 2.795063E-01 | -4.996690E-01 |
| 35 | -3.590894E+00 | 2.624385E-02 | -1.477839E-02 | 1.035260E-01 | -2.024721E-01 |
| 36 | -9.900007E+01 | 5.739570E-04 | -1.147389E-03 | -1.049966E-02 | 2.276595E-02 |
| 45 | -9.416087E+01 | -8.503097E-03 | -2.855810E-03 | -4.585778E-02 | 7.702560E-02 |
| 46 | 9.900000E+01 | 7.580535E-03 | -4.789420E-02 | 7.712120E-02 | -1.245178E-01 |
| 55 | -9.899998E+01 | 4.912672E-02 | -2.047648E-01 | 2.603852E-01 | -1.632846E-01 |
| 56 | -9.900001E+01 | 1.052985E-01 | -3.554225E-01 | 5.199786E-01 | -4.740455E-01 |
| 65 | -5.126470E+00 | 2.595953E-02 | -7.896156E-02 | 5.188760E-02 | -1.839880E-02 |
| 66 | -7.962710E-01 | 2.181914E-02 | -3.554579E-02 | 1.609383E-02 | -4.732576E-03 |
| 75 | -1.225025E+01 | 9.785636E-03 | -2.096201E-02 | 6.690899E-03 | -9.929444E-04 |
| 76 | -1.162709E+01 | 5.737686E-02 | -5.771861E-02 | 1.749419E-02 | -2.673045E-03 |
| Surface | $a_{12}$ | $a_{14}$ | $a_{16}$ | $a_{18}$ | $a_{20}$ |
| 15 | 9.645237E-03 | -1.068878E-02 | 2.440941E-03 | | |
| 16 | -4.142269E-02 | 5.139906E-03 | 1.396902E-04 | | |
| 25 | 2.595278E-01 | -1.034333E-01 | 1.541402E-02 | | |
| 26 | 4.183394E-01 | -1.710590E-01 | 2.742252E-02 | | |
| 35 | 1.999082E-01 | -1.012293E-01 | 2.058454E-02 | | |
| 36 | -2.087427E-02 | 9.755041E-03 | -1.904864E-03 | | |
| 45 | -7.019716E-02 | 3.490880E-02 | -7.353268E-03 | -5.222392E-04 | 3.396765E-04 |
| 46 | 1.332788E-01 | -9.113010E-02 | 3.844062E-02 | -9.112702E-03 | 9.262055E-04 |
| 55 | 1.248348E-02 | 4.859086E-02 | -3.218011E-02 | 8.760963E-03 | -9.170431E-04 |
| 56 | 2.786967E-01 | -1.063065E-01 | 2.533766E-02 | -3.417401E-03 | 1.986262E-04 |
| 65 | 2.142780E-03 | 8.807291E-04 | -3.967317E-04 | 6.132164E-05 | -3.459544E-06 |
| 66 | 9.622234E-04 | -1.313348E-04 | 1.118747E-05 | -5.295437E-07 | 1.055777E-08 |
| 75 | 8.285858E-05 | -4.116735E-06 | 1.162034E-07 | -1.529036E-09 | 4.594000E-12 |
| 76 | 2.350134E-04 | -1.211517E-05 | 3.389789E-07 | -3.792704E-09 | -8.065000E-12 |

Figure 21

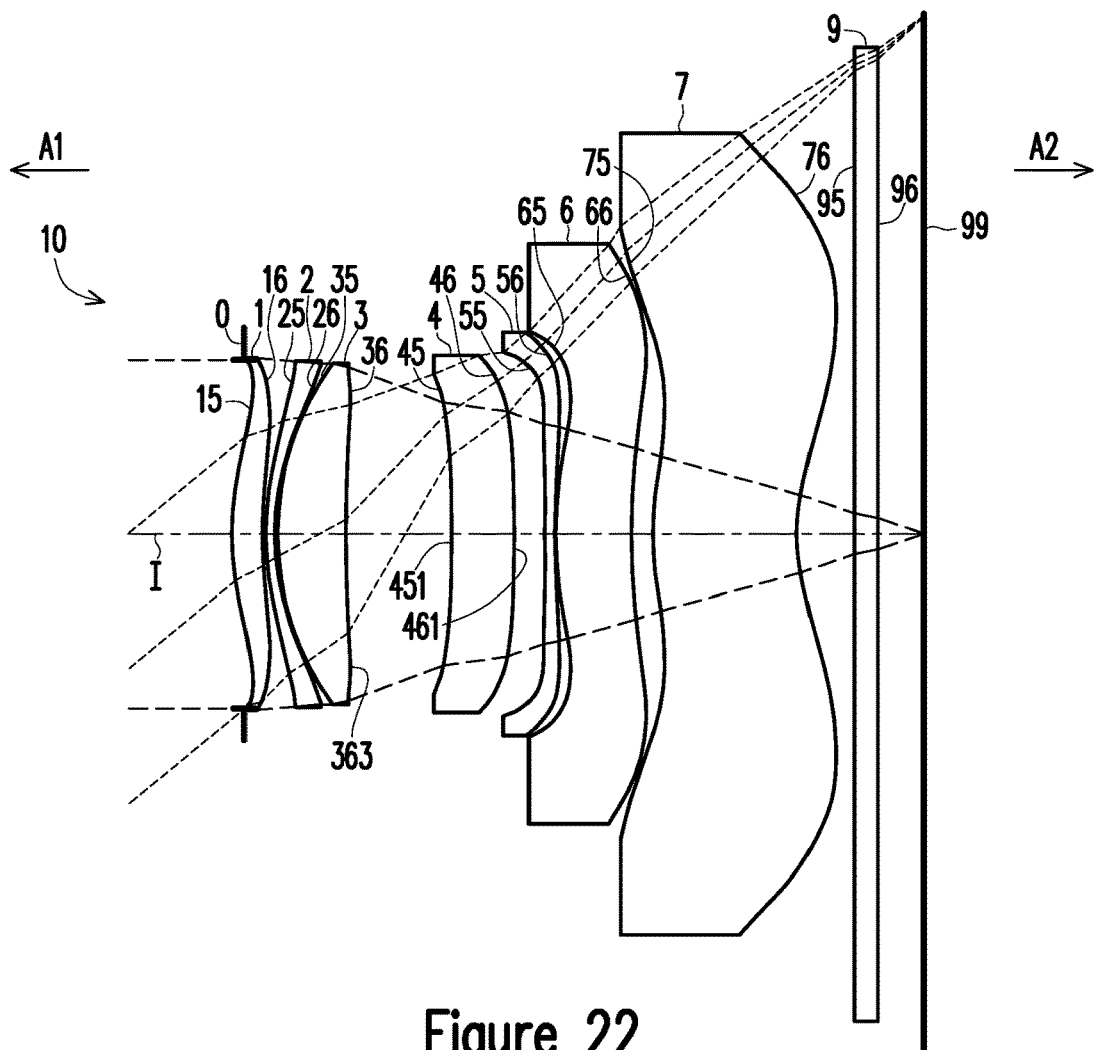
Figure 22
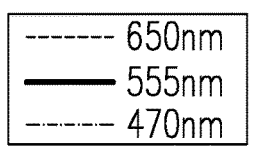
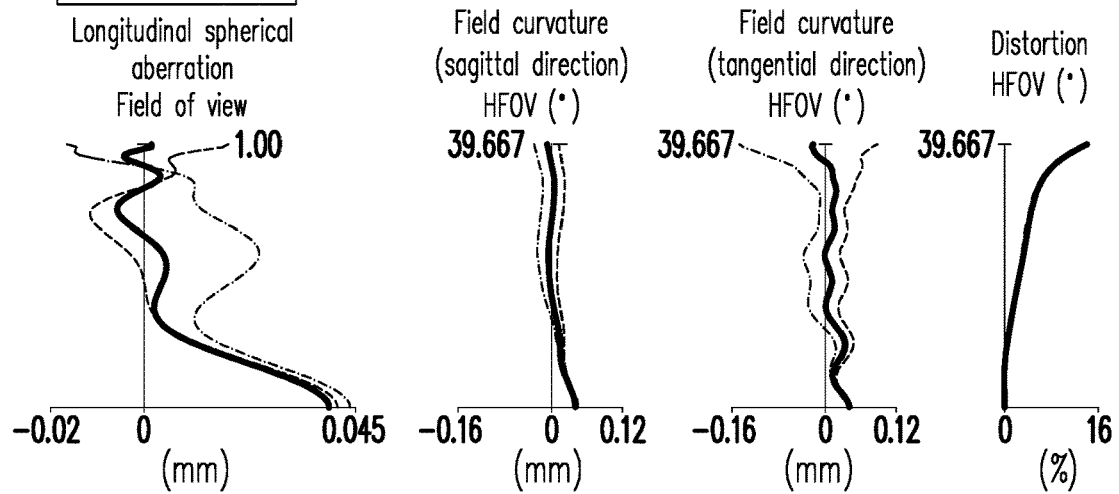
Figure 23A  Figure 23B  Figure 23C  Figure 23D

| Fifth embodiment | | | | | | |
|---|---|---|---|---|---|---|
| EFL=4.815 mm, HFOV=39.667°, TTL=6.018 mm, Fno=1.580, ImgH=4.500 mm | | | | | | |
| Element | Surface | Radius of curvature (mm) | Thickness (mm) | Refractive index | Abbe number | Focal length (mm) |
| Object | | Infinity | Infinity | | | |
| Aperture stop 0 | | Infinity | -0.107 | | | |
| First lens element 1 | Object-side surface 15 | 2.757 | 0.258 | 1.544 | 55.951 | 17.461 |
| | Image-side surface 16 | 3.752 | 0.030 | | | |
| Second lens element 2 | Object-side surface 25 | 2.527 | 0.080 | 1.671 | 19.243 | -22.367 |
| | Image-side surface 26 | 2.138 | 0.024 | | | |
| Third lens element 3 | Object-side surface 35 | 2.577 | 0.598 | 1.544 | 55.951 | 5.272 |
| | Image-side surface 36 | 22.742 | 0.921 | | | |
| Fourth lens element 4 | Object-side surface 45 | -24.566 | 0.543 | 1.544 | 55.951 | 65.277 |
| | Image-side surface 46 | -14.653 | 0.268 | | | |
| Fifth lens element 5 | Object-side surface 55 | 27.815 | 0.080 | 1.671 | 19.243 | -5.916 |
| | Image-side surface 56 | 3.499 | 0.010 | | | |
| Sixth lens element 6 | Object-side surface 65 | 3.542 | 0.663 | 1.544 | 55.951 | 10.326 |
| | Image-side surface 66 | 8.904 | 0.188 | | | |
| Seventh lens element 7 | Object-side surface 75 | 2.280 | 1.254 | 1.544 | 55.951 | 143.468 |
| | Image-side surface 76 | 1.893 | 0.500 | | | |
| Filter 9 | Object-side surface 95 | Infinity | 0.200 | 1.560 | 51.300 | |
| | Image-side surface 96 | Infinity | 0.402 | | | |
| | Image plane 99 | Infinity | | | | |

Figure 24

| Surface | K | $a_4$ | $a_6$ | $a_8$ | $a_{10}$ |
|---|---|---|---|---|---|
| 15 | -5.510197E+00 | 6.992691E-03 | -2.595535E-02 | 1.714532E-02 | -2.538274E-02 |
| 16 | -2.018526E+01 | -3.072359E-02 | -1.216331E-02 | -6.352205E-03 | 1.486782E-02 |
| 25 | -7.886823E+00 | -3.814565E-03 | 1.605296E-02 | -7.317113E-02 | 9.041834E-02 |
| 26 | -4.147552E+00 | 7.892693E-03 | 3.350980E-02 | -6.724309E-02 | 6.108478E-02 |
| 35 | -4.113347E+00 | 6.576534E-03 | 2.523809E-02 | -2.696939E-03 | -9.610850E-03 |
| 36 | -9.900632E+01 | -4.867011E-03 | -1.304813E-03 | -1.171760E-03 | -4.531157E-04 |
| 45 | -9.415442E+01 | -4.527416E-06 | -7.365054E-02 | 1.045296E-01 | -9.643274E-02 |
| 46 | -2.459601E+03 | -3.728201E-03 | -3.989015E-02 | 4.011015E-02 | -5.382274E-02 |
| 55 | 1.652618E+02 | -2.091129E-01 | 4.707724E-01 | -5.107966E-01 | 3.167365E-01 |
| 56 | -1.015856E+02 | -1.651428E-01 | 3.723764E-01 | -4.267353E-01 | 2.804258E-01 |
| 65 | 3.065101E-02 | -6.259911E-02 | 2.329776E-01 | -5.162392E-01 | 6.100199E-01 |
| 66 | 8.701196E+00 | -9.098835E-03 | 6.363719E-02 | -7.328262E-02 | 3.825602E-02 |
| 75 | -1.125403E+01 | -7.800133E-02 | 1.921266E-02 | -2.834491E-03 | 2.379445E-04 |
| 76 | -2.302527E+00 | -7.312534E-02 | 2.452617E-02 | -6.581954E-03 | 1.260043E-03 |
| Surface | $a_{12}$ | $a_{14}$ | $a_{16}$ | $a_{18}$ | $a_{20}$ |
| 15 | 1.763191E-02 | -5.336631E-03 | 5.698513E-04 | | |
| 16 | -7.766707E-03 | 1.606150E-03 | -1.297545E-04 | | |
| 25 | -4.906699E-02 | 1.209834E-02 | -1.091628E-03 | | |
| 26 | -2.869310E-02 | 5.945446E-03 | -3.549960E-04 | | |
| 35 | 5.874311E-03 | -1.221923E-03 | 4.798641E-05 | | |
| 36 | 1.739537E-03 | -5.190406E-04 | -8.104652E-06 | | |
| 45 | 5.207360E-02 | -1.036644E-02 | -4.436034E-03 | 2.959415E-03 | -4.981123E-04 |
| 46 | 4.601889E-02 | -2.259904E-02 | 6.251285E-03 | -8.777289E-04 | 4.240533E-05 |
| 55 | -1.281782E-01 | 4.032198E-02 | -1.284630E-02 | 3.407796E-03 | -4.332956E-04 |
| 56 | -1.138896E-01 | 2.885004E-02 | -4.620591E-03 | 4.666243E-04 | -2.425361E-05 |
| 65 | -4.599313E-01 | 2.237239E-01 | -6.740129E-02 | 1.137650E-02 | -8.204271E-04 |
| 66 | -1.172414E-02 | 2.231434E-03 | -2.595083E-04 | 1.687889E-05 | -4.696994E-07 |
| 75 | -1.457285E-06 | -1.301114E-06 | 6.383345E-08 | 6.703240E-10 | -5.974000E-11 |
| 76 | -1.706471E-04 | 1.591033E-05 | -9.692958E-07 | 3.476179E-08 | -5.559910E-10 |

Figure 25

| Sixth embodiment |||||||
|---|---|---|---|---|---|---|
| EFL=4.149 mm, HFOV=40.267°, TTL=5.665 mm, Fno=1.580, ImgH=4.500 mm |||||||
| Element | Surface | Radius of curvature (mm) | Thickness (mm) | Refractive index | Abbe number | Focal length (mm) |
| Object | | Infinity | Infinity | | | |
| Aperture stop 0 | | Infinity | -0.159 | | | |
| First lens element 1 | Object-side surface 15 | 2.848 | 0.459 | 1.544 | 55.951 | 6.524 |
| | Image-side surface 16 | 13.417 | 0.066 | | | |
| Second lens element 2 | Object-side surface 25 | 3.838 | 0.189 | 1.671 | 19.243 | -16.502 |
| | Image-side surface 26 | 2.801 | 0.356 | | | |
| Third lens element 3 | Object-side surface 35 | 4.236 | 0.490 | 1.544 | 55.951 | 10.136 |
| | Image-side surface 36 | 17.347 | 0.500 | | | |
| Fourth lens element 4 | Object-side surface 45 | 15.265 | 0.153 | 1.544 | 55.951 | 15.302 |
| | Image-side surface 46 | -18.370 | 0.530 | | | |
| Fifth lens element 5 | Object-side surface 55 | -35.598 | 0.282 | 1.671 | 19.243 | -10.005 |
| | Image-side surface 56 | 8.400 | 0.284 | | | |
| Sixth lens element 6 | Object-side surface 65 | 2.162 | 0.575 | 1.544 | 55.951 | -1729.332 |
| | Image-side surface 66 | 1.954 | 0.562 | | | |
| Seventh lens element 7 | Object-side surface 75 | 1.158 | 0.474 | 1.544 | 55.951 | 18.379 |
| | Image-side surface 76 | 1.120 | 0.565 | | | |
| Filter 9 | Object-side surface 95 | Infinity | 0.180 | 1.560 | 51.300 | |
| | Image-side surface 96 | Infinity | 0.000 | | | |
| | Image plane 99 | Infinity | | | | |

Figure 28

| Surface | K | $a_4$ | $a_6$ | $a_8$ | $a_{10}$ |
|---|---|---|---|---|---|
| 15 | -4.322102E+00 | 3.617556E-03 | -4.368744E-03 | -2.499960E-02 | 2.909641E-02 |
| 16 | -2.581037E+01 | -3.436971E-02 | -1.125679E-02 | -1.645622E-02 | 4.471021E-02 |
| 25 | -8.202200E+00 | -5.842837E-03 | -9.266580E-03 | -3.400575E-02 | 8.319365E-02 |
| 26 | -4.311071E+00 | 1.826079E-02 | -4.924302E-03 | -2.851351E-02 | 5.453528E-02 |
| 35 | -4.133434E+00 | 1.257824E-02 | 1.218218E-02 | -9.807808E-03 | 1.364793E-02 |
| 36 | -9.900046E+01 | -5.198925E-03 | -2.842628E-02 | 1.112678E-01 | -2.261822E-01 |
| 45 | -9.416094E+01 | -1.703611E-02 | 9.715502E-02 | -3.056501E-01 | 4.354914E-01 |
| 46 | -1.839663E+04 | -7.047431E-02 | 2.894522E-01 | -6.750471E-01 | 8.842352E-01 |
| 55 | 5.069807E+02 | -5.367911E-03 | 1.215862E-02 | -1.185622E-01 | 2.144484E-01 |
| 56 | -7.604596E+02 | 4.643342E-02 | -1.306847E-01 | 1.467324E-01 | -1.211765E-01 |
| 65 | -4.343471E+00 | -5.006361E-02 | 2.935229E-02 | -1.805517E-03 | -1.563013E-02 |
| 66 | -1.530110E+00 | -1.491509E-01 | 1.302459E-01 | -7.558723E-02 | 2.752936E-02 |
| 75 | -4.975867E+00 | 2.761982E-02 | -7.727022E-02 | 3.403004E-02 | -7.719652E-03 |
| 76 | -3.301874E+00 | -2.870146E-02 | -4.082718E-03 | 3.673623E-03 | -1.041141E-03 |
| Surface | $a_{12}$ | $a_{14}$ | $a_{16}$ | $a_{18}$ | $a_{20}$ |
| 15 | -2.242653E-02 | 9.198213E-03 | -1.487294E-03 | | |
| 16 | -3.936984E-02 | 1.596724E-02 | -2.531103E-03 | | |
| 25 | -6.853965E-02 | 2.649417E-02 | -4.119787E-03 | | |
| 26 | -4.424812E-02 | 1.743769E-02 | -2.834786E-03 | | |
| 35 | -1.135785E-02 | 5.142625E-03 | -1.007376E-03 | | |
| 36 | 2.860222E-01 | -2.251746E-01 | 1.071783E-01 | -2.813649E-02 | 3.089504E-03 |
| 45 | -3.524153E-01 | 1.553125E-01 | -2.918720E-02 | -1.494434E-03 | 9.678621E-04 |
| 46 | -7.085947E-01 | 3.431146E-01 | -9.363352E-02 | 1.175091E-02 | -2.660056E-04 |
| 55 | -2.314661E-01 | 1.558941E-01 | -6.387610E-02 | 1.449050E-02 | -1.397959E-03 |
| 56 | 6.680504E-02 | -2.357956E-02 | 5.056358E-03 | -5.962332E-04 | 2.970326E-05 |
| 65 | 1.140299E-02 | -4.025232E-03 | 7.949701E-04 | -8.327162E-05 | 3.492645E-06 |
| 66 | -6.561860E-03 | 1.030944E-03 | -1.034001E-04 | 6.020378E-06 | -1.556648E-07 |
| 75 | 1.045713E-03 | -8.622177E-05 | 4.048932E-06 | -8.969617E-08 | 5.291510E-10 |
| 76 | 1.719398E-04 | -1.737730E-05 | 1.042831E-06 | -3.393705E-08 | 4.600800E-10 |

Figure 29

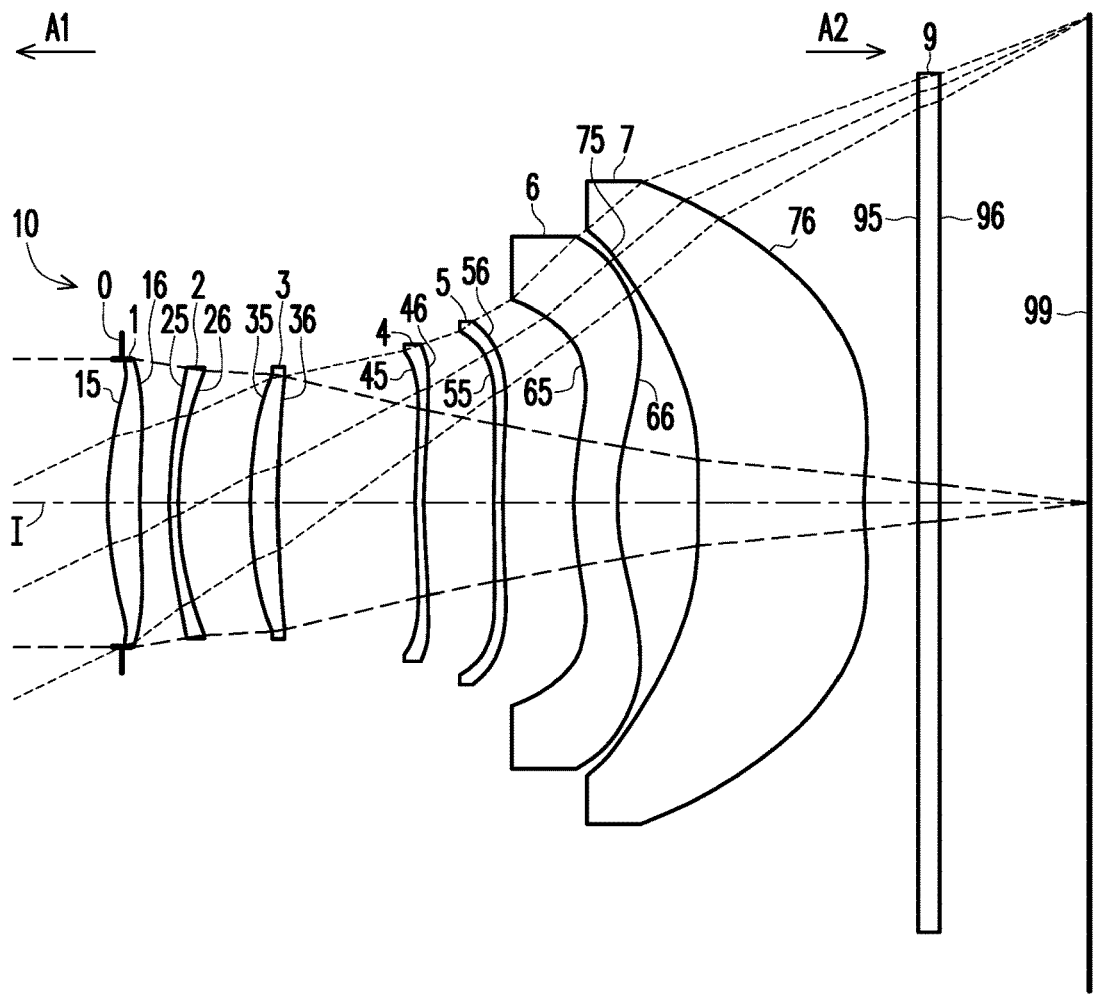
Figure 30
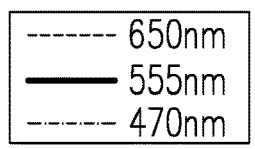
| Longitudinal spherical aberration Field of view | Field curvature (sagittal direction) HFOV (°) | Field curvature (tangential direction) HFOV (°) | Distortion HFOV (°) |
|---|---|---|---|
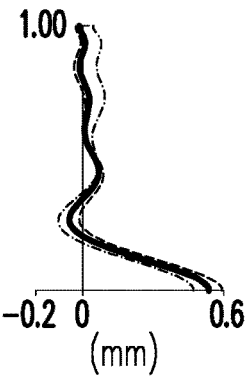
Figure 31A
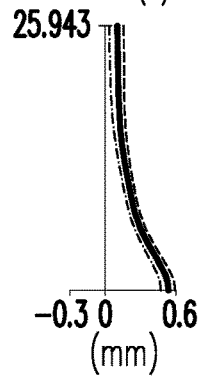
Figure 31B
Figure 31C
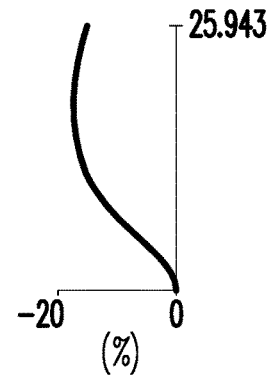
Figure 31D

| Seventh embodiment | | | | | | |
|---|---|---|---|---|---|---|
| EFL=12.103 mm, HFOV=25.943°, TTL=9.086 mm, Fno=4.550, ImgH=4.500 mm | | | | | | |
| Element | Surface | Radius of curvature (mm) | Thickness (mm) | Refractive index | Abbe number | Focal length (mm) |
| Object | | Infinity | Infinity | | | |
| Aperture stop 0 | | Infinity | -0.130 | | | |
| First lens element 1 | Object-side surface 15 | 3.234 | 0.298 | 1.544 | 55.951 | 8.915 |
| | Image-side surface 16 | 9.335 | 0.275 | | | |
| Second lens element 2 | Object-side surface 25 | 3.567 | 0.080 | 1.671 | 19.243 | -32.420 |
| | Image-side surface 26 | 3.041 | 0.669 | | | |
| Third lens element 3 | Object-side surface 35 | 3.958 | 0.250 | 1.544 | 55.951 | 14.748 |
| | Image-side surface 36 | 7.616 | 1.273 | | | |
| Fourth lens element 4 | Object-side surface 45 | 7.415 | 0.081 | 1.544 | 55.951 | 990.522 |
| | Image-side surface 46 | 7.489 | 0.652 | | | |
| Fifth lens element 5 | Object-side surface 55 | 29.098 | 0.080 | 1.671 | 19.243 | -25.634 |
| | Image-side surface 56 | 10.864 | 0.654 | | | |
| Sixth lens element 6 | Object-side surface 65 | 3.668 | 0.402 | 1.544 | 55.951 | -19.797 |
| | Image-side surface 66 | 2.633 | 0.745 | | | |
| Seventh lens element 7 | Object-side surface 75 | 27.568 | 1.538 | 1.544 | 55.951 | -7.745 |
| | Image-side surface 76 | 3.593 | 0.500 | | | |
| Filter 9 | Object-side surface 95 | Infinity | 0.200 | 1.560 | 51.300 | |
| | Image-side surface 96 | Infinity | 1.390 | | | |
| | Image plane 99 | Infinity | | | | |

Figure 32

| Surface | K | $a_4$ | $a_6$ | $a_8$ | $a_{10}$ |
|---|---|---|---|---|---|
| 15 | -4.809673E+00 | 1.964836E-02 | -1.070221E-01 | 1.907768E-01 | -2.032291E-01 |
| 16 | -2.734587E+01 | -1.737428E-02 | -1.125622E-01 | 2.250951E-01 | -2.483305E-01 |
| 25 | -7.918336E+00 | 3.731845E-02 | -2.091798E-01 | 4.460663E-01 | -5.598139E-01 |
| 26 | -3.888432E+00 | 3.217266E-02 | -1.319105E-02 | -2.149540E-01 | 7.924798E-01 |
| 35 | -5.715425E+00 | 2.893156E-02 | -1.602672E-01 | 5.763295E-01 | -1.059524E+00 |
| 36 | -9.898955E+01 | 6.342824E-04 | -3.587003E-02 | 4.877282E-02 | 1.025123E-01 |
| 45 | -9.416302E+01 | -3.660033E-03 | -2.480213E-02 | 4.713281E-02 | -1.948096E-01 |
| 46 | -2.515269E+01 | -3.446357E-02 | 1.534706E-01 | -3.934544E-01 | 5.047451E-01 |
| 55 | 2.925155E+02 | -1.959430E-02 | 5.836633E-02 | -1.326624E-01 | 1.375318E-01 |
| 56 | -1.468860E+02 | 2.200811E-02 | -5.950401E-02 | 4.009331E-02 | -2.486991E-02 |
| 65 | -5.449314E+00 | 8.806399E-02 | -2.080098E-01 | 1.798438E-01 | -1.265817E-01 |
| 66 | -1.504012E+00 | 1.708073E-02 | -7.428301E-02 | 4.073599E-02 | -1.249251E-02 |
| 75 | -2.204826E+01 | -2.032253E-01 | 1.251727E-01 | -4.504636E-02 | 9.695736E-03 |
| 76 | -4.802792E+01 | -1.294169E-01 | 5.806663E-02 | -2.281782E-02 | 6.782797E-03 |
| Surface | $a_{12}$ | $a_{14}$ | $a_{16}$ | $a_{18}$ | $a_{20}$ |
| 15 | 1.138375E-01 | -3.070008E-02 | 2.867302E-03 | | |
| 16 | 1.510797E-01 | -4.665449E-02 | 5.532628E-03 | | |
| 25 | 4.099235E-01 | -1.585830E-01 | 2.474375E-02 | | |
| 26 | -1.348111E+00 | 1.286970E+00 | -7.031056E-01 | 2.044315E-01 | -2.447726E-02 |
| 35 | 1.166644E+00 | -7.851472E-01 | 3.113658E-01 | -6.521385E-02 | 5.301955E-03 |
| 36 | -3.851863E-01 | 5.071631E-01 | -3.440463E-01 | 1.199332E-01 | -1.702319E-02 |
| 45 | 3.586747E-01 | -3.452595E-01 | 1.828302E-01 | -5.088142E-02 | 5.848164E-03 |
| 46 | -3.682259E-01 | 1.481721E-01 | -2.732615E-02 | 5.058309E-05 | 4.908136E-04 |
| 55 | -9.662144E-02 | 4.829857E-02 | -1.675890E-02 | 3.533575E-03 | -3.347558E-04 |
| 56 | 1.312047E-02 | -5.554035E-03 | 1.528005E-03 | -2.290316E-04 | 1.419545E-05 |
| 65 | 6.735988E-02 | -2.434163E-02 | 5.424463E-03 | -6.597986E-04 | 3.279813E-05 |
| 66 | 2.332651E-03 | -2.687647E-04 | 1.957729E-05 | -9.794633E-07 | 2.947317E-08 |
| 75 | -1.255653E-03 | 1.007088E-04 | -5.725237E-06 | 2.603429E-07 | -6.343656E-09 |
| 76 | -1.407459E-03 | 1.914916E-04 | -1.612997E-05 | 7.638458E-07 | -1.567691E-08 |

Figure 33

| Eighth embodiment |||||||
|---|---|---|---|---|---|---|
| EFL=4.030 mm, HFOV=46.363°, TTL=5.440 mm, Fno=1.580, ImgH=4.500 mm |||||||
| Element | Surface | Radius of curvature (mm) | Thickness (mm) | Refractive index | Abbe number | Focal length (mm) |
| Object | | Infinity | Infinity | | | |
| Aperture stop 0 | | Infinity | -0.193 | | | |
| First lens element 1 | Object-side surface 15 | 2.576 | 0.459 | 1.544 | 55.951 | 8.369 |
| | Image-side surface 16 | 5.538 | 0.021 | | | |
| Second lens element 2 | Object-side surface 25 | 2.366 | 0.114 | 1.671 | 19.243 | -18.596 |
| | Image-side surface 26 | 1.953 | 0.178 | | | |
| Third lens element 3 | Object-side surface 35 | 3.407 | 0.379 | 1.544 | 55.951 | 7.980 |
| | Image-side surface 36 | 15.033 | 0.462 | | | |
| Fourth lens element 4 | Object-side surface 45 | 12.088 | 0.354 | 1.544 | 55.951 | 25.526 |
| | Image-side surface 46 | 90.493 | 0.420 | | | |
| Fifth lens element 5 | Object-side surface 55 | 13.082 | 0.345 | 1.671 | 19.243 | -13.431 |
| | Image-side surface 56 | 5.310 | 0.077 | | | |
| Sixth lens element 6 | Object-side surface 65 | 2.048 | 0.549 | 1.544 | 55.951 | 9.927 |
| | Image-side surface 66 | 2.982 | 0.579 | | | |
| Seventh lens element 7 | Object-side surface 75 | 3.125 | 0.761 | 1.544 | 55.951 | -10.431 |
| | Image-side surface 76 | 1.844 | 0.430 | | | |
| Filter 9 | Object-side surface 95 | Infinity | 0.200 | 1.560 | 51.300 | |
| | Image-side surface 96 | Infinity | 0.112 | | | |
| | Image plane 99 | Infinity | | | | |

Figure 36

| Surface | K | $a_4$ | $a_6$ | $a_8$ | $a_{10}$ |
|---|---|---|---|---|---|
| 15 | -4.689499E+00 | 6.818733E-03 | -1.327891E-02 | -6.069239E-03 | -9.542083E-04 |
| 16 | -3.667622E+01 | -3.421538E-02 | -2.125049E-02 | 1.380146E-02 | -4.102356E-03 |
| 25 | -7.707046E+00 | 5.148616E-03 | -3.324888E-02 | 2.723917E-02 | -6.016460E-03 |
| 26 | -4.158800E+00 | 3.119662E-02 | -3.460305E-02 | 3.162533E-02 | -1.389106E-02 |
| 35 | -4.527914E+00 | 1.695419E-02 | -1.297469E-03 | 9.902603E-03 | -5.098654E-03 |
| 36 | -9.961123E+01 | 2.407685E-03 | -1.094651E-02 | 6.361460E-03 | -2.371667E-03 |
| 45 | -1.197513E+02 | -6.438110E-03 | -7.207527E-03 | -5.864634E-03 | 4.420920E-03 |
| 46 | -3.747133E+03 | -1.411524E-02 | -2.897635E-03 | -1.292528E-02 | 8.483495E-03 |
| 55 | 5.435355E+01 | -5.792647E-04 | 2.340772E-02 | -4.670799E-02 | 2.619838E-02 |
| 56 | -6.139581E+01 | -6.940487E-03 | 2.892460E-02 | -3.753363E-02 | 1.863170E-02 |
| 65 | -6.776185E+00 | -3.719709E-03 | -6.527163E-03 | -5.579997E-03 | 2.023593E-03 |
| 66 | -1.017856E+00 | -1.534110E-02 | -4.401891E-03 | -2.643197E-03 | 1.558005E-03 |
| 75 | -1.943881E+01 | -5.135486E-02 | -2.320626E-02 | 1.690201E-02 | -4.631315E-03 |
| 76 | -4.096967E+00 | -4.216654E-02 | 7.484576E-03 | -9.801368E-04 | 3.568438E-05 |
| Surface | $a_{12}$ | $a_{14}$ | $a_{16}$ | $a_{18}$ | $a_{20}$ |
| 15 | 1.272959E-03 | 4.499764E-04 | -2.434406E-04 | | |
| 16 | 8.822243E-04 | -2.329298E-04 | 6.413415E-06 | | |
| 25 | -1.105653E-03 | -5.897617E-04 | 3.113056E-04 | | |
| 26 | -1.583391E-03 | 1.661106E-03 | -1.982407E-04 | | |
| 35 | 6.949492E-04 | 1.681754E-04 | 1.288103E-05 | | |
| 36 | 3.887005E-04 | 3.087521E-04 | -6.460534E-05 | | |
| 45 | -2.408327E-03 | 1.975004E-04 | 4.088615E-05 | 1.788517E-05 | -1.805194E-05 |
| 46 | -2.462229E-03 | 1.110207E-04 | -1.609797E-05 | 2.936247E-06 | 1.645248E-05 |
| 55 | -8.206629E-03 | 1.097701E-03 | -2.665935E-05 | 1.412733E-05 | -1.189201E-05 |
| 56 | -5.289958E-03 | 8.405039E-04 | -6.812016E-05 | 3.688346E-06 | -2.467753E-07 |
| 65 | -4.582114E-04 | 8.512558E-05 | -5.788916E-06 | -5.343769E-07 | 2.198475E-08 |
| 66 | -3.017918E-04 | 2.584648E-05 | -8.795402E-07 | 4.146176E-08 | -5.215439E-09 |
| 75 | 7.309940E-04 | -6.873981E-05 | 3.470951E-06 | -6.906764E-08 | -6.938200E-11 |
| 76 | 3.449463E-06 | -3.370558E-07 | 1.406504E-08 | -2.155250E-10 | -1.792300E-11 |

Figure 37

| Ninth embodiment | | | | | | |
|---|---|---|---|---|---|---|
| EFL=4.082 mm, HFOV=43.400°, TTL=5.322 mm, Fno=1.580, ImgH=4.500 mm | | | | | | |
| Element | Surface | Radius of curvature (mm) | Thickness (mm) | Refractive index | Abbe number | Focal length (mm) |
| Object | | Infinity | Infinity | | | |
| Aperture stop 0 | | Infinity | -0.193 | | | |
| First lens element 1 | Object-side surface 15 | 2.530 | 0.446 | 1.544 | 55.951 | 8.222 |
| | Image-side surface 16 | 5.439 | 0.031 | | | |
| Second lens element 2 | Object-side surface 25 | 2.311 | 0.084 | 1.671 | 19.243 | -19.245 |
| | Image-side surface 26 | 1.935 | 0.265 | | | |
| Third lens element 3 | Object-side surface 35 | 3.386 | 0.305 | 1.544 | 55.951 | 5.805 |
| | Image-side surface 36 | 14.303 | 0.542 | | | |
| Fourth lens element 4 | Object-side surface 45 | 10.231 | 0.170 | 1.544 | 55.951 | 24.564 |
| | Image-side surface 46 | 42.965 | 0.619 | | | |
| Fifth lens element 5 | Object-side surface 55 | 12.987 | 0.282 | 1.671 | 19.243 | -14.364 |
| | Image-side surface 56 | 5.514 | 0.110 | | | |
| Sixth lens element 6 | Object-side surface 65 | 1.866 | 0.421 | 1.544 | 55.951 | 10.810 |
| | Image-side surface 66 | 2.511 | 0.681 | | | |
| Seventh lens element 7 | Object-side surface 75 | 2.540 | 0.603 | 1.544 | 55.951 | -9.638 |
| | Image-side surface 76 | 1.569 | 0.450 | | | |
| Filter 9 | Object-side surface 95 | Infinity | 0.200 | 1.560 | 51.300 | |
| | Image-side surface 96 | Infinity | 0.112 | | | |
| | Image plane 99 | Infinity | | | | |

Figure 40

| Surface | K | $a_4$ | $a_6$ | $a_8$ | $a_{10}$ |
|---|---|---|---|---|---|
| 15 | -4.600524E+00 | 6.782778E-03 | -1.336712E-02 | -6.064169E-03 | -9.366493E-04 |
| 16 | -3.484739E+01 | -3.385571E-02 | -2.120357E-02 | 1.379251E-02 | -4.099942E-03 |
| 25 | -7.631820E+00 | 4.989963E-03 | -3.328945E-02 | 2.727395E-02 | -6.027598E-03 |
| 26 | -4.194580E+00 | 3.106678E-02 | -3.474198E-02 | 3.149860E-02 | -1.392368E-02 |
| 35 | -4.815713E+00 | 1.633770E-02 | -1.592635E-03 | 9.890713E-03 | -5.036414E-03 |
| 36 | -1.797333E+02 | 2.070715E-03 | -1.035518E-02 | 6.735408E-03 | -2.271055E-03 |
| 45 | -6.066243E+01 | -6.760670E-03 | -8.193208E-03 | -6.125765E-03 | 4.438894E-03 |
| 46 | -7.013322E+02 | -1.251118E-02 | -2.581011E-03 | -1.284684E-02 | 8.486281E-03 |
| 55 | 4.708529E+01 | -4.264912E-03 | 2.361525E-02 | -4.630412E-02 | 2.624227E-02 |
| 56 | -7.350791E+01 | -8.442984E-03 | 2.863880E-02 | -3.756013E-02 | 1.863468E-02 |
| 65 | -5.459594E+00 | -1.905212E-03 | -4.999793E-03 | -5.306308E-03 | 1.996033E-03 |
| 66 | -1.126665E+00 | -1.594065E-02 | -4.470314E-03 | -2.644192E-03 | 1.557390E-03 |
| 75 | -2.151703E+01 | -5.198008E-02 | -2.326004E-02 | 1.690081E-02 | -4.631165E-03 |
| 76 | -5.320422E+00 | -4.162949E-02 | 7.587721E-03 | -9.748406E-04 | 3.575978E-05 |
| Surface | $a_{12}$ | $a_{14}$ | $a_{16}$ | $a_{18}$ | $a_{20}$ |
| 15 | 1.285306E-03 | 4.546986E-04 | -2.429128E-04 | | |
| 16 | 8.894424E-04 | -2.280675E-04 | 8.516177E-06 | | |
| 25 | -1.133542E-03 | -6.047799E-04 | 3.153113E-04 | | |
| 26 | -1.565304E-03 | 1.682288E-03 | -1.975817E-04 | | |
| 35 | 7.775593E-04 | 1.924443E-04 | -1.159481E-05 | | |
| 36 | 3.740731E-04 | 2.735188E-04 | -8.511290E-05 | | |
| 45 | -2.367702E-03 | 2.201276E-04 | 5.024788E-05 | 2.205817E-05 | -1.560436E-05 |
| 46 | -2.461476E-03 | 1.158885E-04 | -1.111499E-05 | 6.455872E-06 | 1.841371E-05 |
| 55 | -8.229685E-03 | 1.094084E-03 | -2.069857E-05 | 1.908040E-05 | -9.467913E-06 |
| 56 | -5.288037E-03 | 8.411278E-04 | -6.795493E-05 | 3.729186E-06 | -2.374189E-07 |
| 65 | -4.740469E-04 | 8.279047E-05 | -5.863276E-06 | -5.669891E-07 | 2.536952E-09 |
| 66 | -3.021011E-04 | 2.579919E-05 | -8.822429E-07 | 4.194878E-08 | -5.013280E-09 |
| 75 | 7.310173E-04 | -6.873659E-05 | 3.471365E-06 | -6.901263E-08 | -6.188100E-11 |
| 76 | 3.435395E-06 | -3.393673E-07 | 1.383371E-08 | -2.289600E-10 | -1.714700E-11 |

Figure 41

| Condition expression | First embodiment | Second embodiment | Third embodiment | Fourth embodiment | Fifth embodiment |
|---|---|---|---|---|---|
| T1 | 0.482 | 0.498 | 0.465 | 0.122 | 0.258 |
| G12 | 0.013 | 0.074 | 0.007 | 0.010 | 0.030 |
| T2 | 0.183 | 0.096 | 0.157 | 0.080 | 0.080 |
| G23 | 0.130 | 0.209 | 0.216 | 0.098 | 0.024 |
| T3 | 0.760 | 0.540 | 0.584 | 1.102 | 0.598 |
| G34 | 0.355 | 0.452 | 0.399 | 0.761 | 0.921 |
| T4 | 0.383 | 0.316 | 0.379 | 0.391 | 0.543 |
| G45 | 0.457 | 0.460 | 0.298 | 0.683 | 0.268 |
| T5 | 0.388 | 0.263 | 0.317 | 0.224 | 0.080 |
| G56 | 0.050 | 0.088 | 0.019 | 0.889 | 0.010 |
| T6 | 0.476 | 0.348 | 0.461 | 1.141 | 0.663 |
| G67 | 0.475 | 0.523 | 0.674 | 0.244 | 0.188 |
| T7 | 0.589 | 0.475 | 0.861 | 0.080 | 1.254 |
| G7F | 0.406 | 0.566 | 0.422 | 0.580 | 0.500 |
| TF | 0.200 | 0.200 | 0.200 | 0.200 | 0.200 |
| GFP | 0.112 | 0.112 | 0.112 | 0.103 | 0.402 |
| BFL | 0.718 | 0.878 | 0.734 | 0.883 | 1.102 |
| EFL | 4.393 | 3.884 | 4.191 | 2.967 | 4.815 |
| TL | 4.741 | 4.342 | 4.836 | 5.825 | 4.916 |
| TTL | 5.459 | 5.220 | 5.570 | 6.708 | 6.018 |
| ALT | 3.261 | 2.535 | 3.223 | 3.140 | 3.475 |
| AAG | 1.479 | 1.806 | 1.613 | 2.685 | 1.441 |

Figure 42

| Condition expression | First embodiment | Second embodiment | Third embodiment | Fourth embodiment | Fifth embodiment |
|---|---|---|---|---|---|
| (G67+T7)/(T1+T2) | 1.600 | 1.682 | 2.468 | 1.600 | 4.266 |
| EFL/(AAG+BFL) | 1.999 | 1.447 | 1.786 | 0.831 | 1.893 |
| (T5+T6+T7)/(T1+G12) | 2.933 | 1.900 | 3.477 | 10.928 | 6.942 |
| TL/AAG | 3.205 | 2.404 | 2.999 | 2.169 | 3.412 |
| TTL/BFL | 7.600 | 5.943 | 7.590 | 7.600 | 5.460 |
| (G45+T7)/(T1+G12+T2) | 1.542 | 1.401 | 1.844 | 3.595 | 4.140 |
| ALT/(G34+G45+G56) | 3.786 | 2.535 | 4.500 | 1.346 | 2.898 |
| TL/(T2+G23+T3) | 4.421 | 5.141 | 5.053 | 4.551 | 7.000 |
| (T4+G45+T5+G56+T6)/(T2+G23+T3) | 1.635 | 1.746 | 1.540 | 2.600 | 2.227 |
| TTL/(T5+G56+T6) | 5.975 | 7.466 | 6.994 | 2.976 | 8.000 |
| (T4+G45)/(T2+T5+G56) | 1.354 | 1.734 | 1.374 | 0.900 | 4.783 |
| (EFL+BFL)/AAG | 3.455 | 2.636 | 3.054 | 1.433 | 4.106 |
| (T3+G34+T4)/(T1+G12+T2) | 2.208 | 1.959 | 2.166 | 10.622 | 5.612 |
| (T5+G56+T6)/(T3+G34+T4) | 0.610 | 0.535 | 0.585 | 1.000 | 0.365 |
| AAG/(T6+T7) | 1.388 | 2.195 | 1.220 | 2.200 | 0.752 |
| (T5+T7)/(G12+G67) | 2.001 | 1.236 | 1.731 | 1.200 | 6.137 |
| TTL/EFL | 1.243 | 1.344 | 1.329 | 2.261 | 1.250 |
| (EFL+AAG)/ALT | 1.800 | 2.244 | 1.800 | 1.800 | 1.800 |

Figure 43

| Condition expression | Sixth embodiment | Seventh embodiment | Eighth embodiment | Ninth embodiment |
|---|---|---|---|---|
| T1 | 0.459 | 0.298 | 0.459 | 0.446 |
| G12 | 0.066 | 0.275 | 0.021 | 0.031 |
| T2 | 0.189 | 0.080 | 0.114 | 0.084 |
| G23 | 0.356 | 0.669 | 0.178 | 0.265 |
| T3 | 0.490 | 0.250 | 0.379 | 0.305 |
| G34 | 0.500 | 1.273 | 0.462 | 0.542 |
| T4 | 0.153 | 0.081 | 0.354 | 0.170 |
| G45 | 0.530 | 0.652 | 0.420 | 0.619 |
| T5 | 0.282 | 0.080 | 0.345 | 0.282 |
| G56 | 0.284 | 0.654 | 0.077 | 0.110 |
| T6 | 0.575 | 0.402 | 0.549 | 0.421 |
| G67 | 0.562 | 0.745 | 0.579 | 0.681 |
| T7 | 0.474 | 1.538 | 0.761 | 0.603 |
| G7F | 0.565 | 0.500 | 0.430 | 0.450 |
| TF | 0.180 | 0.200 | 0.200 | 0.200 |
| GFP | 0.000 | 1.390 | 0.112 | 0.112 |
| BFL | 0.745 | 2.090 | 0.742 | 0.762 |
| EFL | 4.149 | 12.103 | 4.030 | 4.082 |
| TL | 4.920 | 6.996 | 4.698 | 4.559 |
| TTL | 5.665 | 9.086 | 5.440 | 5.322 |
| ALT | 2.621 | 2.728 | 2.962 | 2.311 |
| AAG | 2.299 | 4.267 | 1.736 | 2.249 |

Figure 44

| Condition expression | Sixth embodiment | Seventh embodiment | Eighth embodiment | Ninth embodiment |
|---|---|---|---|---|
| (G67+T7)/(T1+T2) | 1.600 | 6.044 | 2.339 | 2.424 |
| EFL/(AAG+BFL) | 1.363 | 1.904 | 1.626 | 1.356 |
| (T5+T6+T7)/(T1+G12) | 2.537 | 3.529 | 3.453 | 2.738 |
| TL/AAG | 2.140 | 1.639 | 2.706 | 2.028 |
| TTL/BFL | 7.604 | 4.347 | 7.332 | 6.981 |
| (G45+T7)/(T1+G12+T2) | 1.407 | 3.357 | 1.989 | 2.180 |
| ALT/(G34+G45+G56) | 1.994 | 1.058 | 3.091 | 1.817 |
| TL/(T2+G23+T3) | 4.753 | 6.999 | 7.000 | 6.975 |
| (T4+G45+T5+G56+T6)/(T2+G23+T3) | 1.762 | 1.869 | 2.600 | 2.451 |
| TTL/(T5+G56+T6) | 4.962 | 8.000 | 5.600 | 6.545 |
| (T4+G45)/(T2+T5+G56) | 0.904 | 0.900 | 1.443 | 1.658 |
| (EFL+BFL)/AAG | 2.129 | 3.326 | 2.749 | 2.154 |
| (T3+G34+T4)/(T1+G12+T2) | 1.603 | 2.459 | 2.013 | 1.814 |
| (T5+G56+T6)/(T3+G34+T4) | 0.999 | 0.708 | 0.813 | 0.799 |
| AAG/(T6+T7) | 2.192 | 2.200 | 1.325 | 2.196 |
| (T5+T7)/(G12+G67) | 1.204 | 1.587 | 1.845 | 1.243 |
| TTL/EFL | 1.365 | 0.751 | 1.350 | 1.304 |
| (EFL+AAG)/ALT | 2.460 | 6.000 | 1.947 | 2.739 |

Figure 45

OPTICAL IMAGING LENS

CROSS-REFERENCE TO RELATED APPLICATION

This application claims the priority benefit of China application serial no. 201911111733.1, filed on Nov. 14, 2019. The entirety of the above-mentioned patent application is hereby incorporated by reference herein and made a part of this specification.

TECHNICAL FIELD

The invention relates to an optical element, and more particularly, to an optical imaging lens.

BACKGROUND

In recent years, optical imaging lenses have evolved and are being applied in a wider range. In addition to requiring a large aperture of the lens and maintaining a short system length, there are also increasing demands for high pixels and high resolution. High pixels imply that an image height of the lens needs to be increased by using a larger image sensor to receive imaging rays to satisfy the demand for high pixels. However, even though the large aperture is designed to enable the lens to receive more imaging rays, high pixels will require even higher resolution of the lens in order to handle more and complex imaging rays. Therefore, how to add multiple lenses to the limited system length while increasing the resolution, the aperture and the image height is a design challenge of the optical imaging lens as well as a problem to be solved.

SUMMARY

The invention provides an optical imaging lens having a shorter system length, a larger aperture (with smaller Fno value) and a larger image height.

An embodiment of the invention provides an optical imaging lens, which includes a first lens element, a second lens element, a third lens element, a fourth lens element, a fifth lens element, a sixth lens element and a seventh lens element sequentially along an optical axis from an object side to an image side. Each of the first lens element to the seventh lens element includes an object-side surface facing toward the object side and allowing imaging rays to pass through and an image-side surface facing toward the image side and allowing the imaging rays to pass through. A periphery region of the image-side surface of the first lens element is convex. A periphery region of the image-side surface of the third lens element is concave. The fourth lens element has positive refracting power. An optical axis region of the image-side surface of the fifth lens element is concave. An optical axis region of the image-side surface of the sixth lens element is concave. The optical imaging lens includes only the first lens element to the seventh lens element as lens elements having refracting power, and satisfies the following condition expression: $(G67+T7)/(T1+T2) \geq 1.600$, wherein G67 is an air gap from the sixth lens element to the seventh lens element along the optical axis, T1 is a thickness of the first lens element along the optical axis, T2 is a thickness of the second lens element along the optical axis, and T7 is a thickness of the seventh lens element along the optical axis.

An embodiment of the invention provides an optical imaging lens, which includes a first lens element, a second lens element, a third lens element, a fourth lens element, a fifth lens element, a sixth lens element and a seventh lens element sequentially along an optical axis from an object side to an image side. Each of the first lens element to the seventh lens element includes an object-side surface facing toward the object side and allowing imaging rays to pass through and an image-side surface facing toward the image side and allowing the imaging rays to pass through. A periphery region of the image-side surface of the third lens element is concave. The fourth lens element has positive refracting power, and a periphery region of the object-side surface of the fourth lens element is concave. An optical axis region of the image-side surface of the fifth lens element is concave. An optical axis region of the image-side surface of the sixth lens element is concave. An optical axis region of the object-side surface of the seventh lens element is convex. The optical imaging lens includes only the first lens element to the seventh lens element as lens elements having refracting power, and satisfies the following condition expression: $(G67+T7)/(T1+T2) \geq 1.600$, wherein G67 is an air gap from the sixth lens element to the seventh lens element along the optical axis, T1 is a thickness of the first lens element along the optical axis, T2 is a thickness of the second lens element along the optical axis, and T7 is a thickness of the seventh lens element along the optical axis.

An embodiment of the invention provides an optical imaging lens, which includes a first lens element, a second lens element, a third lens element, a fourth lens element, a fifth lens element, a sixth lens element and a seventh lens element sequentially along an optical axis from an object side to an image side. Each of the first lens element to the seventh lens element includes an object-side surface facing toward the object side and allowing imaging rays to pass through and an image-side surface facing toward the image side and allowing the imaging rays to pass through. A periphery region of the image-side surface of the third lens element is concave. A periphery region of the object-side surface of the fourth lens element is concave. The fifth lens element has negative refracting power, and an optical axis region of the image-side surface of the fifth lens element is concave. An optical axis region of the image-side surface of the sixth lens element is concave. An optical axis region of the object-side surface of the seventh lens element is convex. The optical imaging lens includes only the first lens element to the seventh lens element as lens elements having refracting power, and satisfies the following condition expression: $(G67+T7)/(T1+T2) \geq 1.600$, wherein G67 is an air gap from the sixth lens element to the seventh lens element along the optical axis, T1 is a thickness of the first lens element along the optical axis, T2 is a thickness of the second lens element along the optical axis, and T7 is a thickness of the seventh lens element along the optical axis.

Based on the above, the optical imaging lens according to the embodiment of the invention has the following advantageous effects. With the design that satisfies the concave and convex surfaces of the lens elements, the condition of the refracting power, and the design that satisfies the above conditional expressions, the optical imaging lens can have the shorter system length, the larger aperture (with smaller Fno value) and the larger image height.

To make the aforementioned more comprehensible, several embodiments accompanied with drawings are described in detail as follows.

BRIEF DESCRIPTION OF THE DRAWINGS

FIG. 8 shows detailed optical data of the optical imaging lens according to the first embodiment of the invention.

FIG. 9 shows aspheric parameters of the optical imaging lens according to the first embodiment of the invention.

FIG. 12 shows detailed optical data of the optical imaging lens according to the second embodiment of the invention.

FIG. 13 shows aspheric parameters of the optical imaging lens according to the second embodiment of the invention.

FIG. 14 is a schematic view illustrating an optical imaging lens according to a third embodiment of the invention.

FIG. 15A to FIG. 15D illustrate a longitudinal spherical aberration and other aberrations of the optical imaging lens according to the third embodiment of the invention.

FIG. 16 shows detailed optical data of the optical imaging lens according to the third embodiment of the invention.

FIG. 17 shows aspheric parameters of the optical imaging lens according to the third embodiment of the invention.

FIG. 18 is a schematic view illustrating an optical imaging lens according to a fourth embodiment of the invention.

FIG. 19A to FIG. 19D illustrate a longitudinal spherical aberration and other aberrations of the optical imaging lens according to the fourth embodiment of the invention.

FIG. 20 shows detailed optical data of the optical imaging lens according to the fourth embodiment of the invention.

FIG. 21 shows aspheric parameters of the optical imaging lens according to the fourth embodiment of the invention.

FIG. 22 is a schematic view illustrating an optical imaging lens according to a fifth embodiment of the invention.

FIG. 23A to FIG. 23D illustrate a longitudinal spherical aberration and other aberrations of the optical imaging lens according to the fifth embodiment of the invention.

FIG. 24 shows detailed optical data of the optical imaging lens according to the fifth embodiment of the invention.

FIG. 25 shows aspheric parameters of the optical imaging lens according to the fifth embodiment of the invention.

FIG. 28 shows detailed optical data of the optical imaging lens according to the sixth embodiment of the invention.

FIG. 29 shows aspheric parameters of the optical imaging lens according to the sixth embodiment of the invention.

FIG. 30 is a schematic view illustrating an optical imaging lens according to a seventh embodiment of the invention.

FIG. 31A to FIG. 31D are diagrams illustrating longitudinal spherical aberration and other aberrations of the optical imaging lens according to the seventh embodiment.

FIG. 32 shows detailed optical data of the optical imaging lens according to the seventh embodiment of the invention.

FIG. 33 shows aspheric parameters of the optical imaging lens according to the seventh embodiment of the invention.

FIG. 36 shows detailed optical data of the optical imaging lens according to the eighth embodiment of the invention.

FIG. 37 shows aspheric parameters of the optical imaging lens according to the eighth embodiment of the invention.

FIG. 40 shows detailed optical data of the optical imaging lens according to the ninth embodiment of the invention.

FIG. 41 shows aspheric parameters of the optical imaging lens according to the ninth embodiment of the invention.

FIG. 42 and FIG. 43 show important parameters and values in related relational expressions of the optical lens assembly according to the first to the sixth embodiments of the invention.

FIG. 44 and FIG. 45 show important parameters and values in related relational expressions of the optical lens assembly according to the sixth to the ninth embodiments of the invention.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
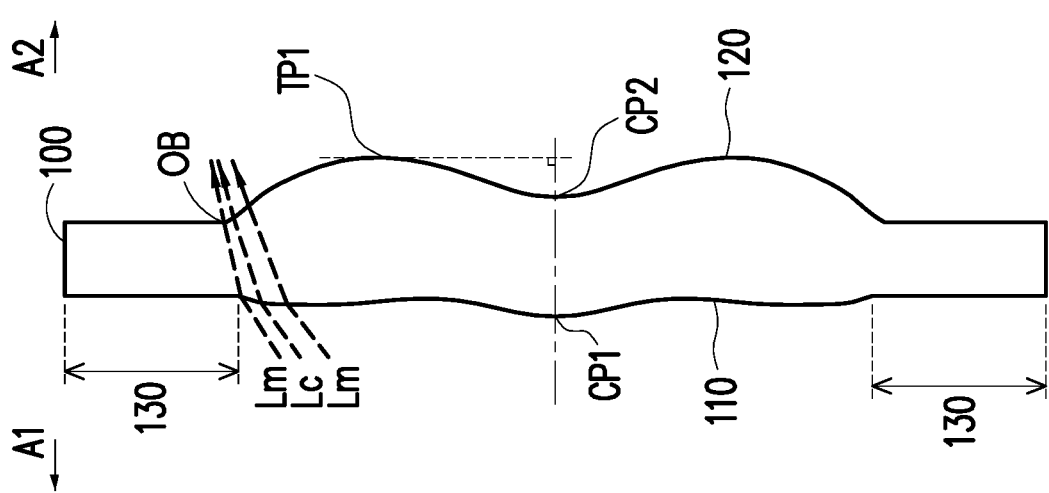
FIG. 1 is a schematic view illustrating a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
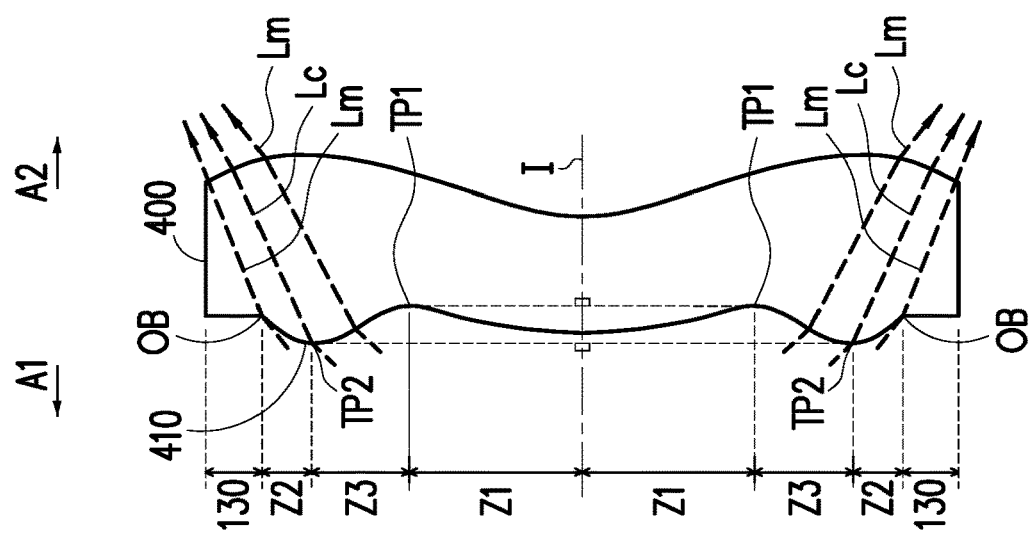
FIG. 4 is a schematic view illustrating a surface structure of a lens element according to a second example.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
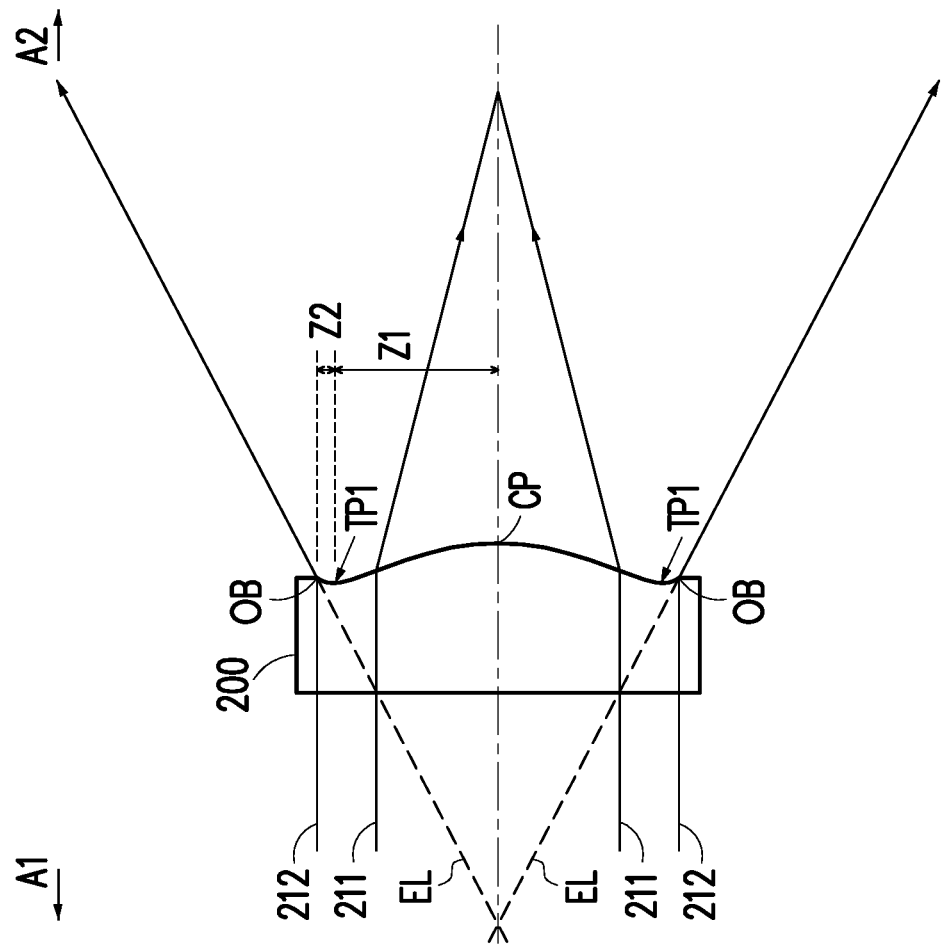
FIG. 2 is a schematic view illustrating a concave and convex surface structure of a lens element and a ray focal point.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
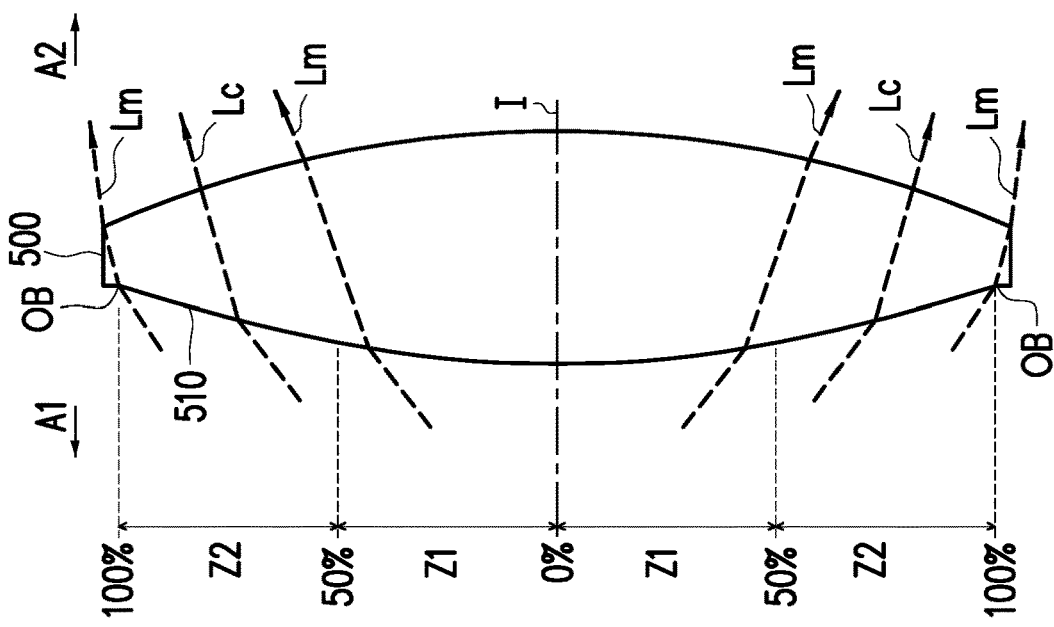
FIG. 5 is a schematic view illustrating a surface structure of a lens element according to a third example.
Figure 3:
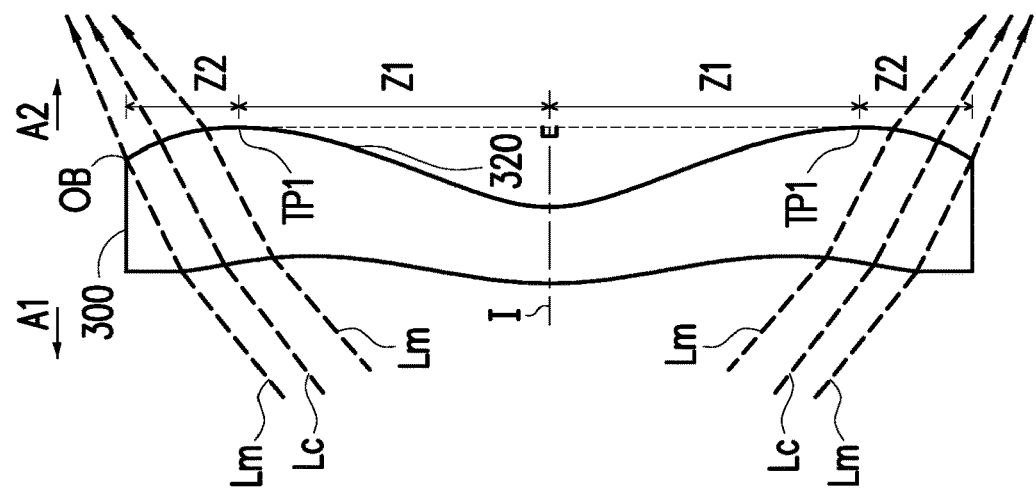
FIG. 3 is a schematic view illustrating a surface structure of a lens element according to a first example.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
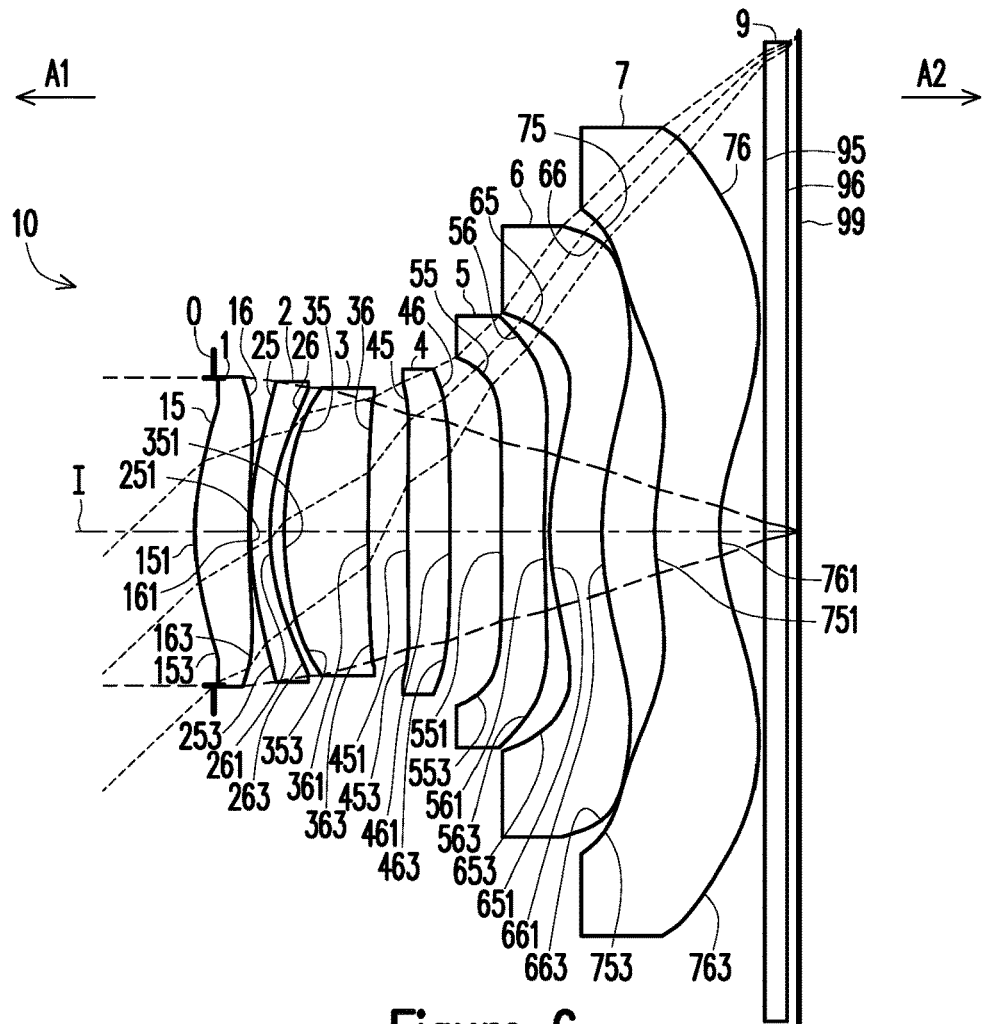
FIG. 6 is a schematic view illustrating an optical imaging lens according to a first embodiment of the invention.

FIG. 6 is a schematic view illustrating an optical imaging lens according to a first embodiment of the invention, and FIG. 7A to FIG. 7D illustrate a longitudinal spherical aberration and other aberrations of the optical imaging lens according to the first embodiment of the invention. Referring to FIG. 6, an optical imaging lens 10 in the first embodiment of the invention includes an aperture stop 0, a first lens element 1, a second lens element 2, a third lens element 3, a fourth lens element 4, a fifth lens element 5, a sixth lens element 6, a seventh lens element 7 and a filter 9 sequentially along the optical axis I of the optical imaging lens 10 from the object side A1 to the image side A2. When rays emitted from an object to be captured enter the optical imaging lens 10, the rays pass through the aperture stop 0, the first lens element 1, the second lens element 2, the third lens element 3, the fourth lens element 4, the fifth lens element 5, the sixth lens element, the seventh lens element 7 and the filter 9, an image may be formed on an image plane 99. The filter 9 is disposed between an image-side surface 76 of the seventh lens element 7 and the image plane 99. It should be noted that, the object side is one side that faces toward the object to be captured, and the image side is one side that faces toward the image plane 99. In this embodiment, the filter may be an IR Cut Filter, but the invention is not limited thereto.

In this embodiment, each of the first lens element 1, the second lens element 2, the third lens element 3, the fourth lens element 4, the fifth lens element 5, the sixth lens element 6, the seventh lens element 7 and the filter 9 of the optical imaging lens 10 includes an object-side surface 15, 25, 35, 45, 55, 65, 75, 95 facing toward the object side and allowing the imaging rays to pass through and an image-side surface 16, 26, 36, 46, 56, 66, 76, 96 facing toward the image side and allowing the imaging rays to pass through. In this embodiment, the first lens element 1 is placed between the aperture stop 0 and the second lens element 2.

The first lens element 1 has positive refracting power. The first lens element 1 is made of plastic material. An optical axis region 151 of the object-side surface 15 of the first lens element 1 is convex, and a periphery region 153 thereof is concave. An optical axis region 161 of the image-side surface 16 of the first lens element 1 is concave, and a periphery region 163 thereof is convex. In this embodiment, each of the object-side surface 15 and the image-side surface 16 of the first lens element 1 is an aspheric surface, but the invention is not limited thereto.

The second lens element 2 has negative refracting power. The second lens element 2 is made of plastic material. An optical axis region 251 of the object-side surface 25 of the second lens element 2 is convex, and a periphery region 253 thereof is convex. An optical axis region 261 of the image-side surface 26 of the second lens element 2 is concave, and a periphery region 263 thereof is concave. In this embodiment, each of the object-side surface 25 and the image-side surface 26 of the second lens element 2 is an aspheric surface, but the invention is not limited thereto.

The third lens element 3 has positive refracting power. The third lens element 3 is made of plastic material. An optical axis region 351 of the object-side surface 35 of the third lens element 3 is convex, and a periphery region 353 thereof is convex. An optical axis region 361 of the image-side surface 36 of the third lens element 3 is concave, and a periphery region 363 thereof is concave. In this embodiment, each of the object-side surface 35 and the image-side surface 36 of the third lens element 3 is an aspheric surface, but the invention is not limited thereto.

The fourth lens element 4 has positive refracting power. The fourth lens element 4 is made of plastic material. An optical axis region 451 of the object-side surface 45 of the fourth lens element 4 is convex, and a periphery region 453 thereof is concave. An optical axis region 461 of the image-side surface 46 of the fourth lens element 4 is concave, and a periphery region 463 thereof is convex. In this embodiment, each of the object-side surface 45 and the image-side surface 46 of the fourth lens element 4 is an aspheric surface, but the invention is not limited thereto.

The fifth lens element 5 has negative refracting power. The fifth lens element 5 is made of plastic material. An optical axis region 551 of the object-side surface 55 of the fifth lens element 5 is convex, and a periphery region 553 thereof is concave. An optical axis region 561 of the image-side surface 56 of the fifth lens element 5 is concave, and a periphery region 563 thereof is convex. In this embodiment, each of the object-side surface 55 and the image-side surface 56 of the fifth lens element 5 is an aspheric surface, but the invention is not limited thereto.

The sixth lens element 6 has positive refracting power. The sixth lens element 6 is made of plastic material. An optical axis region 651 of the object-side surface 65 of the sixth lens element 6 is convex, and a periphery region 653 thereof is concave. An optical axis region 661 of the image-side surface 66 of the sixth lens element 6 is concave, and a periphery region 663 thereof is convex. In this embodiment, each of the object-side surface 65 and the image-side surface 66 of the sixth lens element 6 is an aspheric surface, but the invention is not limited thereto.

The seventh lens element 7 has negative refracting power. The seventh lens element 7 is made of plastic material. An optical axis region 751 of the object-side surface 75 of the seventh lens element 7 is convex, and a periphery region 753 thereof is concave. An optical axis region 761 of the image-side surface 76 of the seventh lens element 7 is concave, and a periphery region 763 thereof is convex. In this embodiment, each of the object-side surface 75 and the image-side surface 76 of the seventh lens element 7 is an aspheric surface, but the invention is not limited thereto.

In this embodiment, lens elements having refracting power included by the optical imaging lens 10 are only the seven lens elements described above.

Other detailed optical data of the first embodiment are shown in FIG. 8. In the optical imaging lens 10 of the first embodiment, an overall effective focal length (EFL) is 4.393 mm (millimeter), a half field of view (HFOV) is 43.546°, a F-number (Fno) is 1.580, a system length is 5.459 mm and an image height is 4.500 mm, wherein the system length refers to a distance from the object-side surface 15 of the first lens element 1 to the image plane 99 along the optical axis I.

Further, in this embodiment, all of the object-side surfaces 15, 25, 35, 45, 55, 65, and 75 and the image-side surfaces 16, 26, 36, 46, 56, 66, and 76 of the first lens element 1, the second lens element 2, the third lens element 3, the fourth lens element 4, the fifth lens element 5, the sixth lens element 6 and the seventh lens element 7 (14 surfaces in total) are the aspheric surfaces, wherein the object-side surfaces 15, 25, 35, 45, 55, 65 and 75 and the light input surfaces 16, 26, 36, 46, 56, 66 and 76 are common even a sphere surfaces. These aspheric surfaces are defined by the following equation.

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

Therein,
R: a radius of curvature of the surface of the lens element close to the optical axis I;
Z: a depth of the aspheric surface (a perpendicular distance between the point on the aspheric surface that is spaced from the optical axis I by the distance Y and a tangent plane tangent to a vertex of the aspheric surface on the optical axis I);
Y: a distance from a point on an aspheric curve to the optical axis I;
K: a conic constant;
$a_{2i}$: the 2i-th aspheric coefficient.

The aspheric coefficients of the object-side surface 15 of the first lens element 1 to the image-side surface 76 of the seventh lens element 7 in Equation (1) are shown in FIG. 9. In FIG. 9, a field number "15" indicates that the respective row includes the aspheric coefficients of the object-side surface 15 of the first lens element 1, and the same applies to the rest of fields. In the present embodiment and the following embodiments, the 2i-th aspheric coefficients $a_2$ are all 0.

Figures 7A, 7B, 7C, 7D:
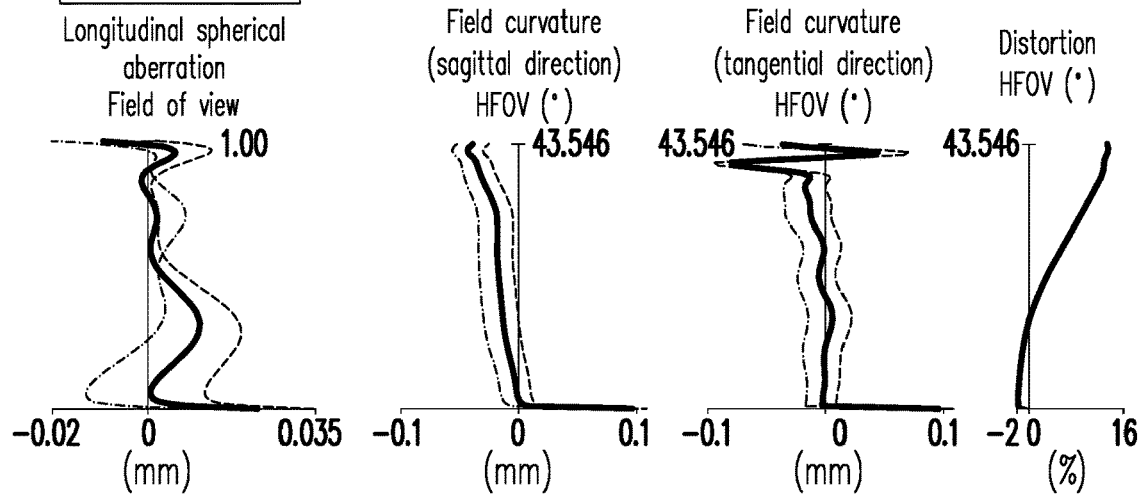
FIG. 7A to FIG. 7D illustrate a longitudinal spherical aberration and other aberrations of the optical imaging lens according to the first embodiment of the invention.

In addition, the relationship between the important parameters in the optical imaging lens 10 of the first embodiment is shown in FIGS. 42 and 43.
Therein,
EFL is the effective focal length of the optical imaging lens 10;
HFOV is the half field of view of the optical imaging lens 10;
Fno is the f-number of the optical imaging lens 10;
ImgH is an image height of the optical imaging lens 10;
T1 is a thickness of the first lens element 1 along the optical axis I;
T2 is a thickness of the second lens element 2 along the optical axis I;
T3 is a thickness of the third lens element 3 along the optical axis I;
T4 is a thickness of the fourth lens element 4 along the optical axis I;
T5 is a thickness of the fifth lens element 5 along the optical axis I;
T6 is a thickness of the sixth lens element 6 along the optical axis I;
T7 is a thickness of the seventh lens element 7 along the optical axis I;
G12 is a distance from the image-side surface 16 of the first lens element 1 to the object-side surface 25 of the second lens element 2 along the optical axis I, that is, an air gap from the first lens element 1 to the second lens element 2 along the optical axis I;
G23 is a distance from the image-side surface 26 of the second lens element 2 to the object-side surface 35 of the third lens element 3 along the optical axis I, that is, an air gap from the second lens element 2 to the third lens element 3 along the optical axis I;
G34 is a distance from the image-side surface 36 of the third lens element 3 to the object-side surface 45 of the fourth lens element 4 along the optical axis I, that is, an air gap from the third lens element 3 to the fourth lens element 4 along the optical axis I;
G45 is a distance from the image-side surface 46 of the fourth lens element 4 to the object-side surface 55 of the fifth lens element 5 along the optical axis I, that is, an air gap from the fourth lens element 4 to the fifth lens element 5 along the optical axis I;
G56 is a distance from the image-side surface 56 of the fifth lens element 5 to the object-side surface 65 of the sixth lens element 6 along the optical axis I, that is, an air gap from the fifth lens element 5 to the sixth lens element 6 along the optical axis I;
G67 is a distance from the image-side surface 66 of the sixth lens element 6 to the object-side surface 75 of the seventh lens element 7 along the optical axis I, that is, an air gap from the sixth lens element 6 to the seventh lens element 7 along the optical axis I;
G7F is a distance from the image-side surface 76 of the seventh lens element 7 to the object-side surface 95 of the filter 9 along the optical axis I, that is, an air gap from the seventh lens element 7 to the filter 9 along the optical axis I;
TF is a thickness of the filter 9 along the optical axis I;
GFP is a distance from the image-side surface 95 of the filter 9 to the image plane 99 along the optical axis I, that is, an air gap from the filter 9 to the image plane 99 along the optical axis I;
TTL is a distance from the object-side surface 15 of the first lens element 1 to the image plane 99 along the optical axis I;
BFL is a distance from the image-side surface 76 of the seventh lens element 7 to the image plane 99 along the optical axis I;
AAG is a sum of six air gaps of the first lens element 1 to the seventh lens element 7 along the optical axis I, that is, a sum of the air gaps G12, G23, G34, G45, G56 and G67;

ALT is a sum of seven lens thicknesses of the first lens element 1 to the seventh lens element 7 along the optical axis I, i.e., a sum of the thicknesses T1, T2, T3, T4, T5, T6 and T7;

TL is a distance from the object-side surface 15 of the first lens element 1 to the image-side surface 76 of the seventh lens element 7 along the optical axis I;

Besides, it is further defined that:

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
f7 is a focal length of the seventh lens element 7;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
n7 is a refractive index of the seventh lens element 7;
V1 is an Abbe number of the first lens element 1, and the Abbe number may also be referred to as a dispersion coefficient;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6; and
V7 is an Abbe number of the seventh lens element 7;

Referring to FIG. 7A to FIG. 7D, the diagram of FIG. 7A illustrates longitudinal spherical aberration of the first embodiment; the diagrams of FIG. 7B and FIG. 7C respectively illustrate the field curvature aberration in sagittal direction and the field curvature aberration in tangential direction on the image plane 99 when wavelengths are 470 nm, 555 nm and 650 nm in the first embodiment; the diagram of FIG. 7D illustrates the distortion aberration on the image plane 99 when the wavelengths are 470 nm, 555 nm and 650 nm in the first embodiment. The longitudinal spherical aberration in the first embodiment is shown in FIG. 7A, in which the curve of each wavelength is close to one another and approaches the center position, which indicates that the off-axis ray of each wavelength at different heights is concentrated around the imaging point. The skew margin of the curve of each wavelength indicates that the imaging point deviation of the off-axis ray at different heights is controlled within the range of ±0.035 mm. Therefore, it is evident that the first embodiment can significantly improve spherical aberration of the same wavelength. In addition, the curves of the three representative wavelengths are close to one another, which represents that the imaging positions of the rays with different wavelengths are concentrated. Therefore, the chromatic aberration can also be significantly improved.

In the two diagrams of the field curvature aberrations as illustrated in FIG. 7B and FIG. 7C, the three representative wavelengths have the focal length variation within ±0.10 mm in the entire field of view, which indicates that aberration of the optical system provided by the first embodiment can be effectively eliminated. In FIG. 7D, the diagram of distortion aberration shows that the distortion aberration in the first embodiment is maintained within the range of ±16%, which indicates that the distortion aberration in the first embodiment can comply with the imaging quality required by the optical system. Accordingly, compared to the existing optical lenses, with the system length shortened to 5.459 mm, the first embodiment can still provide a favorable imaging quality. Therefore, the first embodiment can shorten the lens length and provide a good imaging quality while maintaining favorable optical properties.

Figure 10:
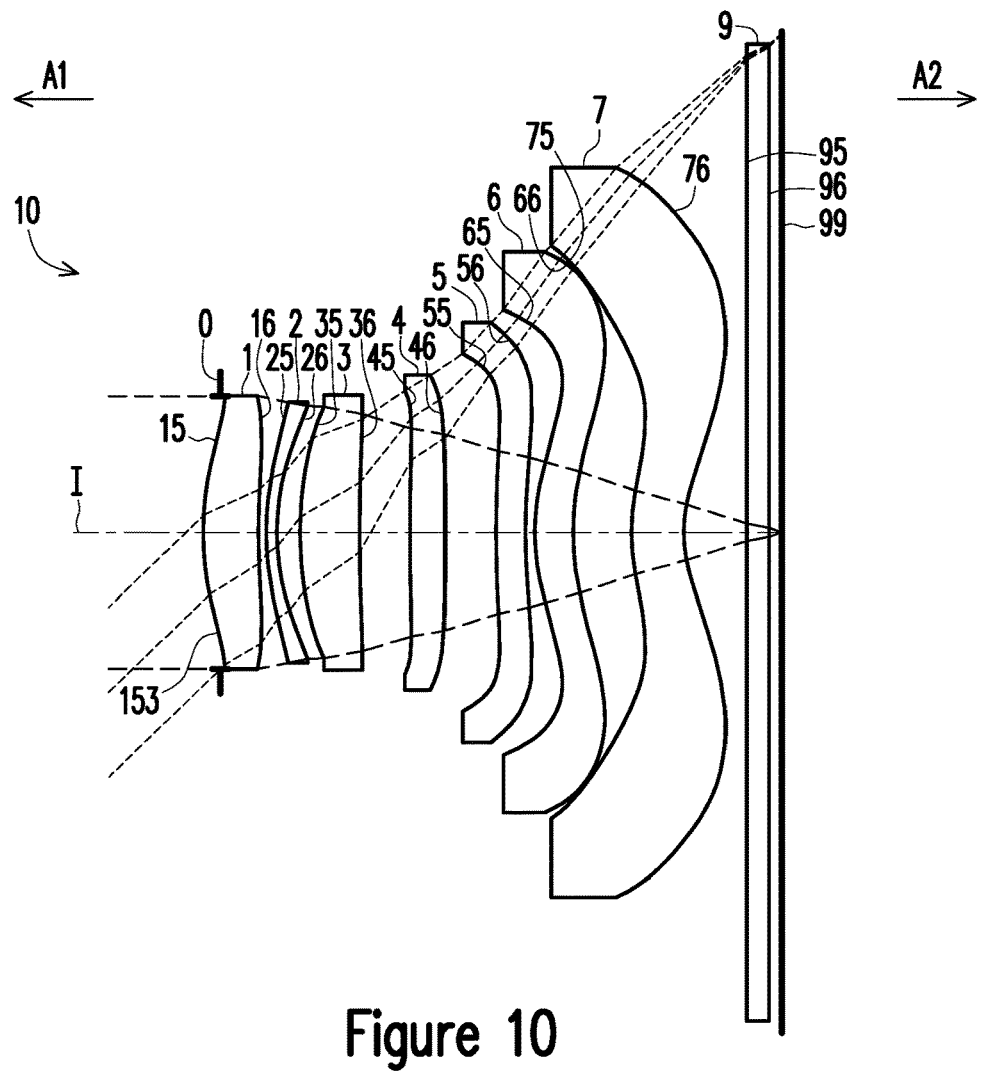
FIG. 10 is a schematic view illustrating an optical imaging lens according to a second embodiment of the invention.

FIG. 10 is a schematic view illustrating an optical imaging lens according to a second embodiment of the invention, and FIG. 11A to FIG. 11D illustrate a longitudinal spherical aberration and other aberrations of the optical imaging lens according to the second embodiment of the invention. Referring to FIG. 10, the optical imaging lens 10 according to the second embodiment of the invention is similar to that of the first embodiment, while the optical data, the aspheric coefficients, and the parameters of the lens elements 1, 2, 3, 4, 5, 6 and 7 in these two embodiments are different to some extent. In addition, in this embodiment, the periphery region 153 of the object-side surface 15 of the first lens element 1 is convex. For clear illustration, it should be noted that the same reference numbers of the optical axis regions and the periphery regions with surface shapes similar to those in the first embodiment are omitted in FIG. 10.

Detailed optical data of the optical imaging lens 10 of the second embodiment are shown in FIG. 12. In the optical imaging lens 10 of the second embodiment, an overall effective focal length (EFL) is 3.884 millimeter (mm), a half field of view (HFOV) is 44.262°, an F-number (Fno) is 1.580, a system length is 5.220 mm and an image height is 4.500 mm.

FIG. 13 shows the aspheric coefficients of the object-side surface 15 of the first lens element 1 to the image-side surface 76 of the seventh lens element 7 in Equation (1) according to the second embodiment.

In addition, the relationship between the important parameters in the optical imaging lens 10 of the second embodiment is shown in FIGS. 42 and 43.

Figure 11A:
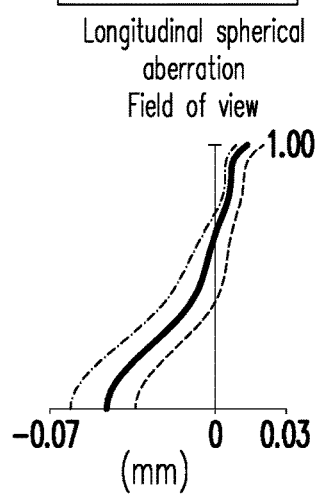
FIG. 11A to FIG. 11D illustrate a longitudinal spherical aberration and other aberrations of the optical imaging lens according to the second embodiment of the invention.
Figure 11B:
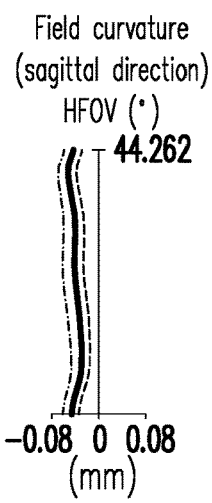
Figure 11C:
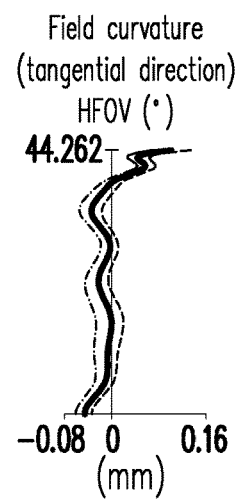
Figure 11D:
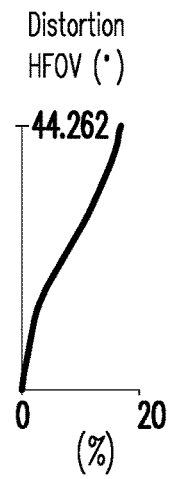

The longitudinal spherical aberration of the second embodiment is shown in FIG. 11A, in which imaging point deviations of the off-axis rays at different heights are controlled within the range of ±0.07 mm. In the two diagrams of the field curvature aberrations as illustrated in FIG. 11B and FIG. 11C, the three representative wavelengths have the focal length variation in sagittal direction within ±0.08 mm and the focal length variation in tangential direction within ±0.16 mm in the entire field of view. In FIG. 11D, the diagram of distortion aberration shows that the distortion aberration in the second embodiment is maintained within the range of ±20%.

In view of the above description, it can be known that the system length TTL of the second embodiment is shorter than that of the first embodiment. The field curvature in sagittal direction of the second embodiment is better than that of the first embodiment. In addition, a thickness difference between the optical axis of the lens elements and the periphery region of the second embodiment is smaller than that of the first embodiment, and is thus easier to manufacture so a higher yield rate can be achieved.

FIG. 14 is a schematic view illustrating an optical imaging lens according to a third embodiment of the invention, and FIG. 15A to FIG. 15D illustrate a longitudinal spherical aberration and other aberrations of the optical imaging lens according to the third embodiment of the invention. Referring to FIG. 14, the optical imaging lens 10 according to the third embodiment of the invention is similar to that of the first embodiment, while the optical data, the aspheric coefficients, and the parameters of the lens elements 1, 2, 3, 4, 5, 6 and 7 in these two embodiments are different to some extent. For clear illustration, it should be noted that the same reference numbers of the optical axis regions and the periphery regions with surface shapes similar to those in the first embodiment are omitted in FIG. 14.

Detailed optical data of the optical imaging lens 10 of the third embodiment are shown in FIG. 16. In the optical imaging lens 10 of the third embodiment, an overall effective focal length (EFL) is 4.191 millimeter (mm), a half field of view (HFOV) is 45.359°, an F-number (Fno) is 1.580, a system length is 5.570 mm and an image height is 4.500 mm.

FIG. 17 shows the aspheric coefficients of the object-side surface 15 of the first lens element 1 to the image-side surface 76 of the seventh lens element 7 in Equation (1) according to the third embodiment.

In addition, the relationship between the important parameters in the optical imaging lens 10 of the third embodiment is shown in FIGS. 42 and 43.

The longitudinal spherical aberration of the third embodiment is shown in FIG. 15A, in which imaging point deviations of the off-axis rays at different heights are controlled within the range of ±0.05 mm. In the two diagrams of the field curvature aberrations as illustrated in FIG. 15B and FIG. 15C, the three representative wavelengths have the focal length variation within ±0.12 mm in the entire field of view. In FIG. 15D, the diagram of distortion aberration shows that the distortion aberration in the third embodiment is maintained within the range of ±6%.

In view of the above description, it can be known that the distortion aberration of the third embodiment is better than that of the first embodiment. In addition, a thickness difference between the optical axis of the lens elements and the periphery region of the third embodiment is smaller than that of the first embodiment, and is thus easier to manufacture so a higher yield rate can be achieved.

FIG. 18 is a schematic view illustrating an optical imaging lens according to a fourth embodiment of the invention, and FIG. 19A to FIG. 19D illustrate a longitudinal spherical aberration and other aberrations of the optical imaging lens according to the fourth embodiment of the invention. Referring to FIG. 18, the optical imaging lens 10 according to the fourth embodiment of the invention is similar to that of the first embodiment, while the optical data, the aspheric coefficients, and the parameters of the lens elements 1, 2, 3, 4, 5, 6 and 7 in these two embodiments are different to some extent. In addition, in this embodiment, the periphery region 153 of the object-side surface 15 of the first lens element 1 is convex. Refracting power of the sixth lens element 6 is negative. Refracting power of the seven lens element 7 is positive. For clear illustration, it should be noted that the same reference numbers of the optical axis regions and the periphery regions with surface shapes similar to those in the first embodiment are omitted in FIG. 18.

Detailed optical data of the optical imaging lens 10 of the fourth embodiment are shown in FIG. 20. In the optical imaging lens 10 of the fourth embodiment, an overall effective focal length (EFL) is 2.967 millimeter (mm), a half field of view (HFOV) is 33.543°, an F-number (Fno) is 1.580, a system length is 6.708 mm and an image height is 4.500 mm.

FIG. 21 shows the aspheric coefficients of the object-side surface 15 of the first lens element 1 to the image-side surface 76 of the seventh lens element 7 in Equation (1) according to the fourth embodiment.

In addition, the relationship between the important parameters in the optical imaging lens 10 of the fourth embodiment is shown in FIGS. 42 and 43.

The longitudinal spherical aberration of the fourth embodiment is shown in FIG. 19A, in which imaging point deviations of the off-axis rays at different heights are controlled within the range of ±0.6 mm. In the two diagrams of the field curvature aberrations as illustrated in FIG. 19B and FIG. 19C, the three representative wavelengths have the focal length variation within ±0.56 mm in the entire field of view. In FIG. 19D, the diagram of distortion aberration shows that the distortion aberration in the fourth embodiment is maintained within the range of ±110%.

In view of the above description, it can be known that a thickness difference between the optical axis of the lens elements and the periphery region of the fourth embodiment is smaller than that of the first embodiment, and is thus easier to manufacture so a higher yield rate can be achieved.

FIG. 22 is a schematic view illustrating an optical imaging lens according to a fifth embodiment of the invention, and FIG. 23A to FIG. 23D illustrate a longitudinal spherical aberration and other aberrations of the optical imaging lens according to the fifth embodiment of the invention. Referring to FIG. 22, the optical imaging lens 10 according to the fifth embodiment of the invention is similar to that of the first embodiment, while the optical data, the aspheric coefficients, and the parameters of the lens elements 1, 2, 3, 4, 5, 6 and 7 in these two embodiments are different to some extent. In addition, in this embodiment, the periphery region 363 of the image-side surface 36 of the third lens element 3 is convex. The optical axis region 451 of the object-side surface 45 of the fourth lens element 4 is concave. The optical axis region 461 of the image-side surface 46 of the fourth lens element 4 is convex. Refracting power of the seven lens element 7 is positive. For clear illustration, it should be noted that the same reference numbers of the optical axis regions and the periphery regions with surface shapes similar to those in the first embodiment are omitted in FIG. 22.

Detailed optical data of the optical imaging lens 10 of the fifth embodiment are shown in FIG. 24. In the optical imaging lens 10 of the fifth embodiment, an overall effective focal length (EFL) is 4.815 millimeter (mm), a half field of view (HFOV) is 39.667°, an F-number (Fno) is 1.580, a system length is 6.018 mm and an image height is 4.500 mm.

FIG. 25 shows the aspheric coefficients of the object-side surface 15 of the first lens element 1 to the image-side surface 76 of the seventh lens element 7 in Equation (1) according to the fifth embodiment.

In addition, the relationship between the important parameters in the optical imaging lens 10 of the fifth embodiment is shown in FIGS. 42 and 43.

The longitudinal spherical aberration of the fifth embodiment is shown in FIG. 23A, in which imaging point deviations of the off-axis rays at different heights are controlled within the range of ±0.045 mm. In the two diagrams of the field curvature aberrations as illustrated in FIG. 23B and FIG. 23C, the three representative wavelengths have the focal length variation within ±0.16 mm in the entire field of view. In FIG. 23D, the diagram of distortion aberration shows that the distortion aberration in the fifth embodiment is maintained within the range of ±16%.

In view of the above description, it can be known that a thickness difference between the optical axis of the lens elements and the periphery region of the fifth embodiment is smaller than that of the first embodiment, and is thus easier to manufacture so a higher yield rate can be achieved.

Figure 26:
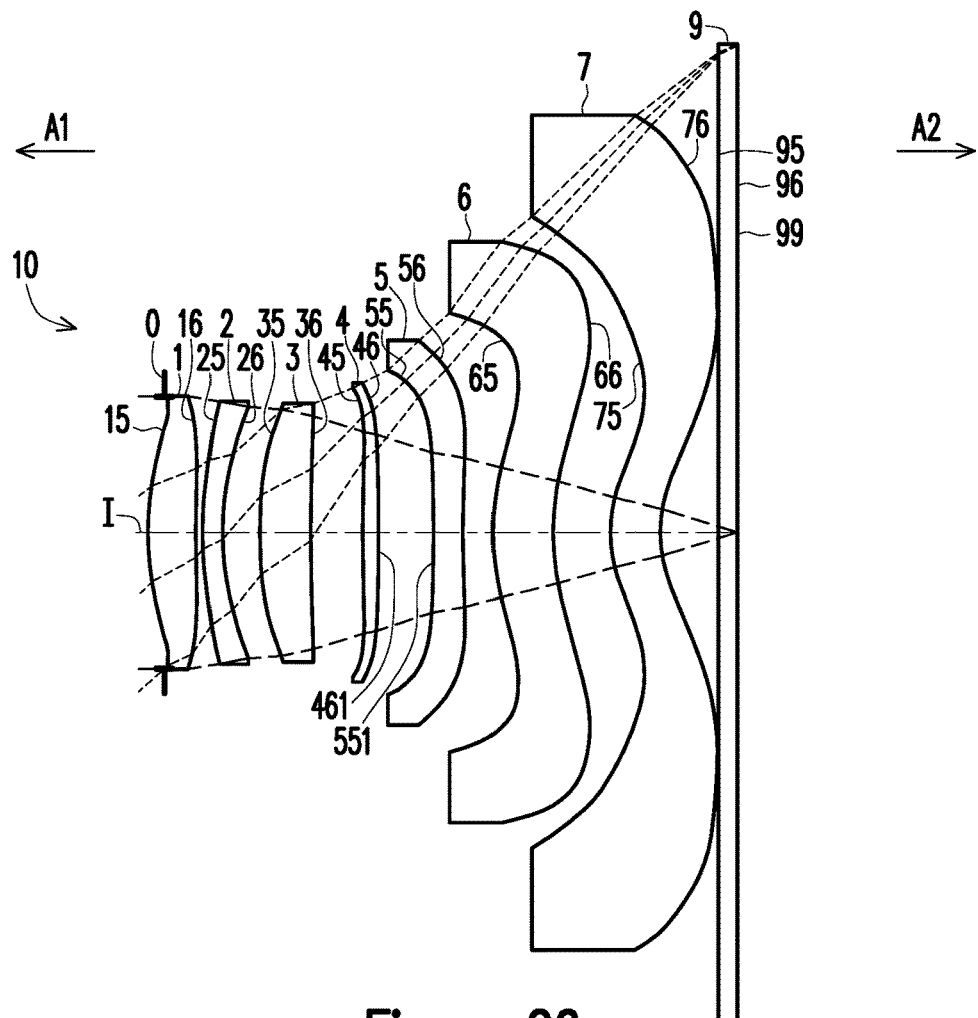
FIG. 26 is a schematic view illustrating an optical imaging lens according to a sixth embodiment of the invention.

FIG. 26 is a schematic view illustrating an optical imaging lens according to a sixth embodiment of the invention, and FIG. 27A to FIG. 27D illustrate a longitudinal spherical aberration and other aberrations of the optical imaging lens according to the sixth embodiment of the invention. Referring to FIG. 26, the optical imaging lens 10 according to the sixth embodiment of the invention is similar to that of the first embodiment, while the optical data, the aspheric coefficients, and the parameters of the lens elements 1, 2, 3, 4, 5, 6 and 7 in these two embodiments are different to some extent. In addition, in this embodiment, the optical axis region 461 of the image-side surface 46 of the fourth lens element 4 is convex. The optical axis region 551 of the object-side surface 55 of the fifth lens element 5 is concave. The sixth lens element 6 has negative refracting power. The seventh lens element 7 has positive refracting power. For clear illustration, it should be noted that the same reference numbers of the optical axis regions and the periphery regions with surface shapes similar to those in the first embodiment are omitted in FIG. 26.

Detailed optical data of the optical imaging lens 10 of the sixth embodiment are shown in FIG. 28. In the optical imaging lens 10 of the sixth embodiment, an overall effective focal length (EFL) is 4.149 millimeter (mm), a half field of view (HFOV) is 40.267°, an F-number (Fno) is 1.580, a system length is 5.665 mm and an image height is 4.500 mm.

FIG. 29 shows the aspheric coefficients of the object-side surface 15 of the first lens element 1 to the image-side surface 76 of the seventh lens element 7 in Equation (1) according to the sixth embodiment.

In addition, the relationship between the important parameters in the optical imaging lens 10 of the sixth embodiment is shown in FIGS. 44 and 45.

Figure 27A:
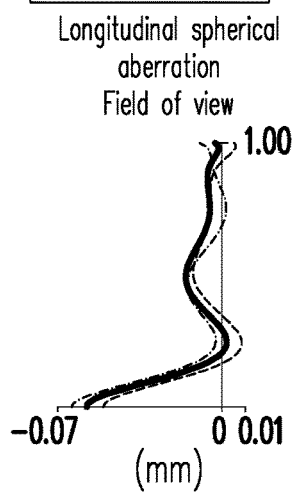
FIG. 27A to FIG. 27D illustrate a longitudinal spherical aberration and other aberrations of the optical imaging lens according to the sixth embodiment of the invention.
Figure 27B:
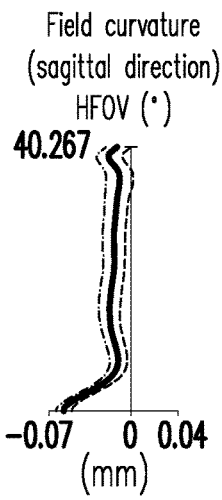
Figure 27C:
Figure 27D:
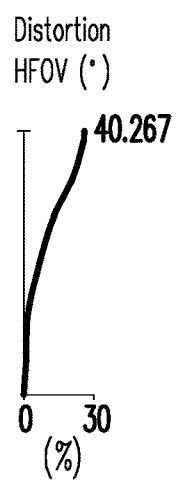

The longitudinal spherical aberration of the sixth embodiment is shown in FIG. 27A, in which imaging point deviations of the off-axis rays at different heights are controlled within the range of ±0.07 mm. In the two diagrams of the field curvature aberrations as illustrated in FIG. 27B and FIG. 27C, the three representative wavelengths have the focal length variation within ±0.07 mm in the entire field of view. In FIG. 27D, the diagram of distortion aberration shows that the distortion aberration in the sixth embodiment is maintained within the range of ±30%.

In view of the above description, it can be known that the field curvature aberration of the sixth embodiment is better than that of the first embodiment. In addition, a thickness difference between the optical axis of the lens elements and the periphery region of the sixth embodiment is smaller than that of the first embodiment, and is thus easier to manufacture so a higher yield rate can be achieved.

FIG. 30 is a schematic view illustrating an optical imaging lens according to a seventh embodiment of the invention, and FIG. 31A to FIG. 31D are diagrams illustrating longitudinal spherical aberration and other aberrations of the optical imaging lens according to the seventh embodiment. Referring to FIG. 30, the optical imaging lens 10 according to the seventh embodiment of the invention is similar to that of the first embodiment, while the optical data, the aspheric coefficients, and the parameters of the lens elements 1, 2, 3, 4, 5, 6 and 7 in these two embodiments are different to some extent. In addition, in this embodiment, the sixth lens element 6 has negative refracting power. For clear illustration, it should be noted that the same reference numbers of the optical axis regions and the periphery regions with surface shapes similar to those in the first embodiment are omitted in FIG. 30.

Detailed optical data of the optical imaging lens 10 of the seventh embodiment are shown in FIG. 32. In the optical imaging lens 10 of the seventh embodiment, an overall effective focal length (EFL) is 12.103 millimeter (mm), a half field of view (HFOV) is 25.943°, an F-number (Fno) is 4.550, a system length is 9.086 mm and an image height is 4.500 mm.

FIG. 33 shows the aspheric coefficients of the object-side surface 15 of the first lens element 1 to the image-side surface 76 of the seventh lens element 7 in Equation (1) according to the seventh embodiment.

In addition, the relationship between the important parameters in the optical imaging lens 10 of the seventh embodiment is shown in FIGS. 44 and 45.

The longitudinal spherical aberration of the seventh embodiment is shown in FIG. 31A, in which imaging point deviations of the off-axis rays at different heights are controlled within the range of ±0.6 mm. In the two diagrams of the field curvature aberrations as illustrated FIG. 31B and FIG. 31C, the three representative wavelengths have the focal length variation within ±0.6 mm in the entire field of view. In FIG. 31D, the diagram of distortion aberration shows that the distortion aberration in the seventh embodiment is maintained within the range of ±20%.

In view of the above description, it can be known that a thickness difference between the optical axis of the lens elements and the periphery region of the seventh embodiment is smaller than that of the first embodiment, and is thus easier to manufacture so a higher yield rate can be achieved.

Figure 34:
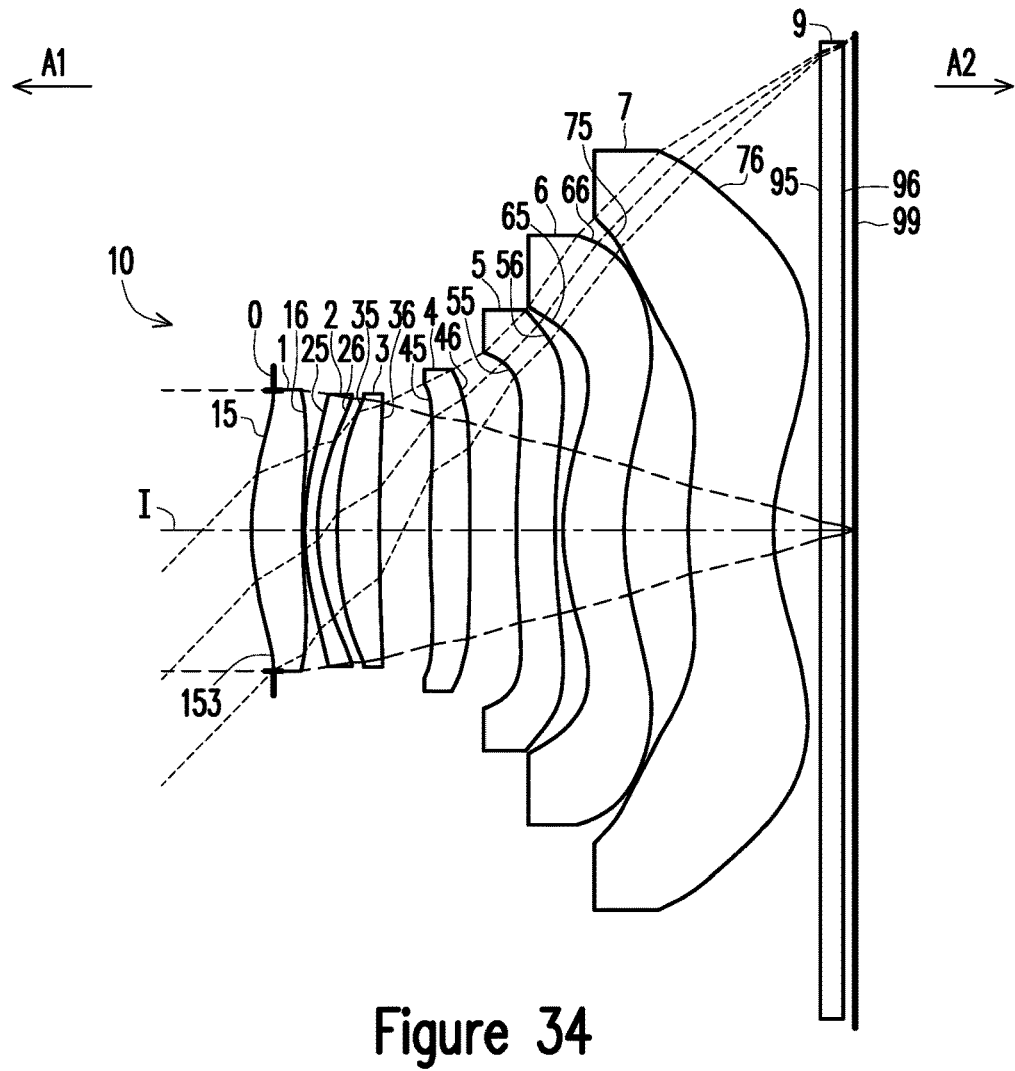
FIG. 34 is a schematic view illustrating an optical imaging lens according to an eighth embodiment of the invention.

FIG. 34 is a schematic view illustrating an optical imaging lens according to an eighth embodiment of the invention, and FIG. 35A to FIG. 35D are diagrams illustrating longitudinal spherical aberration and other aberrations of the optical imaging lens according to the eighth embodiment. Referring to FIG. 34, the optical imaging lens 10 according to the eighth embodiment of the invention is similar to that of the first embodiment, while the optical data, the aspheric coefficients, and the parameters of the lens elements 1, 2, 3, 4, 5, 6 and 7 in these two embodiments are different to some extent. In addition, in this embodiment, the periphery region 153 of the object-side surface 15 of the first lens element 1 is convex. For clear illustration, it should be noted that the same reference numbers of the optical axis regions and the periphery regions with surface shapes similar to those in the first embodiment are omitted in FIG. 34.

Detailed optical data of the optical imaging lens 10 of the eighth embodiment are shown in FIG. 36. In the optical imaging lens 10 of the eighth embodiment, an overall effective focal length (EFL) is 4.030 millimeter (mm), a half field of view (HFOV) is 46.363°, an F-number (Fno) is 1.580, a system length is 5.440 mm and an image height is 4.500 mm.

FIG. 37 shows the aspheric coefficients of the object-side surface 15 of the first lens element 1 to the image-side surface 76 of the seventh lens element 7 in Equation (1) according to the eighth embodiment.

In addition, the relationship between the important parameters in the optical imaging lens 10 of the eighth embodiment is shown in FIGS. 44 and 45.

Figures 35A, 35B, 35C, 35D:
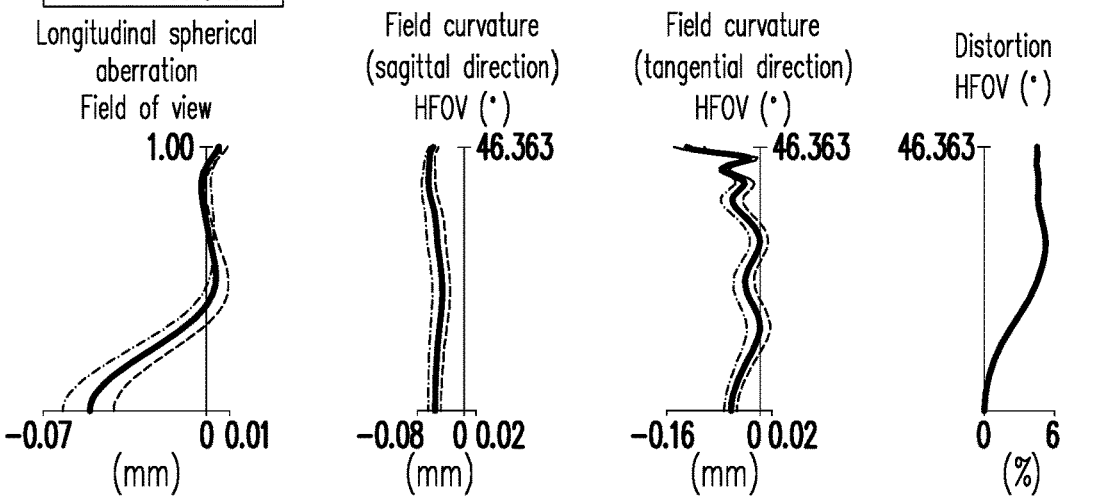
FIG. 35A to FIG. 35D are diagrams illustrating longitudinal spherical aberration and other aberrations of the optical imaging lens according to the eighth embodiment.

The longitudinal spherical aberration of the eighth embodiment is shown in FIG. 35A, in which imaging point deviations of the off-axis rays at different heights are controlled within the range of ±0.07 mm. In the two diagrams of the field curvature aberrations as illustrated in FIG. 35B and FIG. 35C, the three representative wavelengths have the focal length variation in sagittal direction within ±0.08 mm and the focal length variation in tangential direction within ±0.16 mm in the entire field of view. In FIG. 35D, the diagram of distortion aberration shows that the distortion aberration in the eighth embodiment is maintained within the range of ±6%.

In view of the above description, it can be known that the system length TTL of the eighth embodiment is shorter than that of the first embodiment. The field curvature in sagittal direction of the eighth embodiment is better than that of the first embodiment. The distortion aberration of the eighth embodiment is better than that of the first embodiment. In addition, a thickness difference between the optical axis of the lens elements and the periphery region of the eighth embodiment is smaller than that of the first embodiment, and is thus easier to manufacture so a higher yield rate can be achieved.

Figure 38:
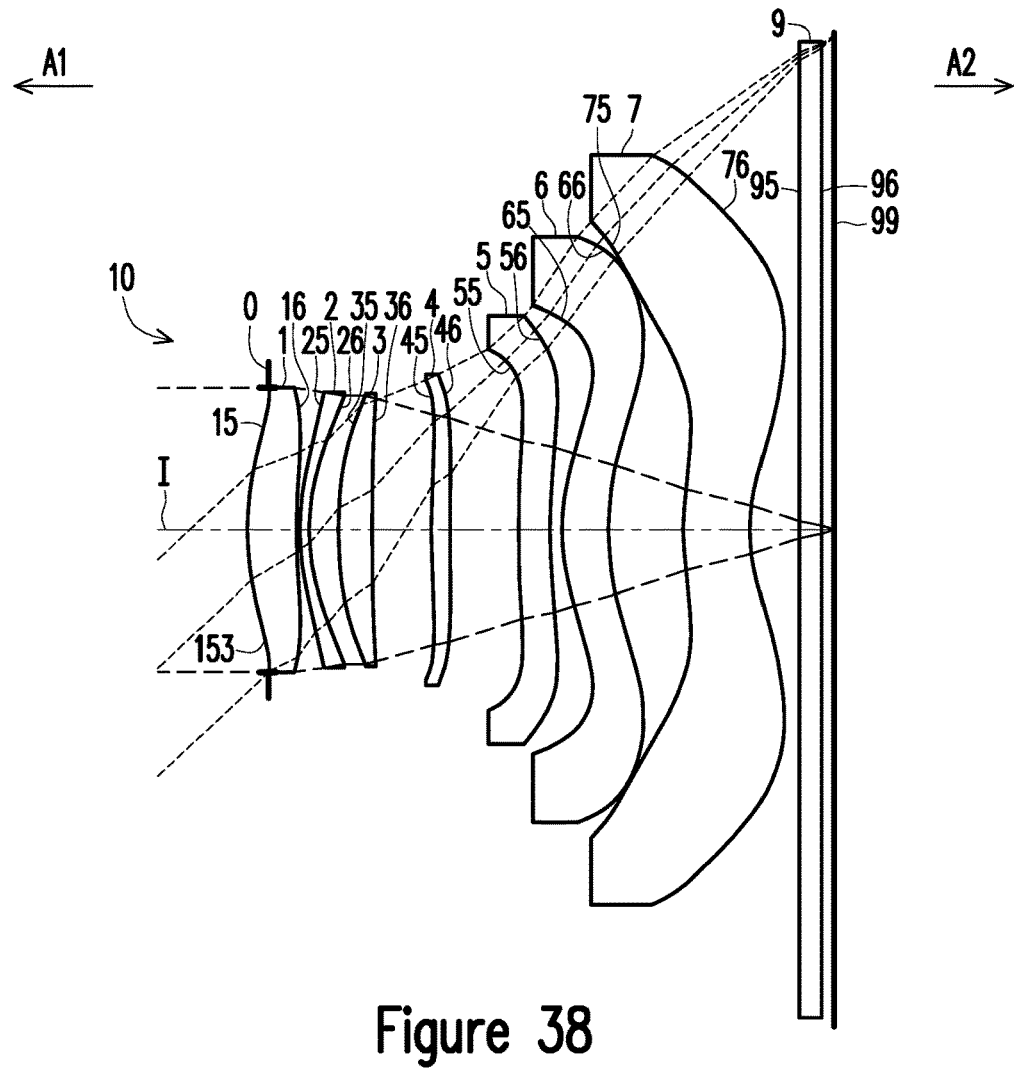
FIG. 38 is a schematic view illustrating an optical imaging lens according to a ninth embodiment of the invention.

FIG. 38 is a schematic view illustrating an optical imaging lens according to a ninth embodiment of the invention, and FIG. 39A to FIG. 39D are diagrams illustrating a longitudinal spherical aberration and other aberrations of the optical imaging lens according to the ninth embodiment. Referring to FIG. 38, the optical imaging lens 10 according to the ninth embodiment of the invention is similar to that of the first embodiment, while the optical data, the aspheric coefficients, and the parameters of the lens elements 1, 2, 3, 4, 5, 6 and 7 in these two embodiments are different to some extent. In addition, in this embodiment, the periphery region 153 of the object-side surface 15 of the first lens element 1 is convex. For clear illustration, it should be noted that the same reference numbers of the optical axis regions and the periphery regions with surface shapes similar to those in the first embodiment are omitted in FIG. 38.

Detailed optical data of the optical imaging lens 10 of the ninth embodiment are shown in FIG. 40. In the optical imaging lens 10 of the ninth embodiment, an overall effective focal length (EFL) is 4.082 millimeter (mm), a half field of view (HFOV) is 43.400°, an F-number (Fno) is 1.580, a system length is 5.322 mm and an image height is 4.500 mm.

FIG. 41 shows the aspheric coefficients of the object-side surface 15 of the first lens element 1 to the image-side surface 76 of the seventh lens element 7 in Equation (1) according to the ninth embodiment.

In addition, the relationship between the important parameters in the optical imaging lens 10 of the ninth embodiment is shown in FIGS. 44 and 45.

Figures 39A, 39B, 39C, 39D:
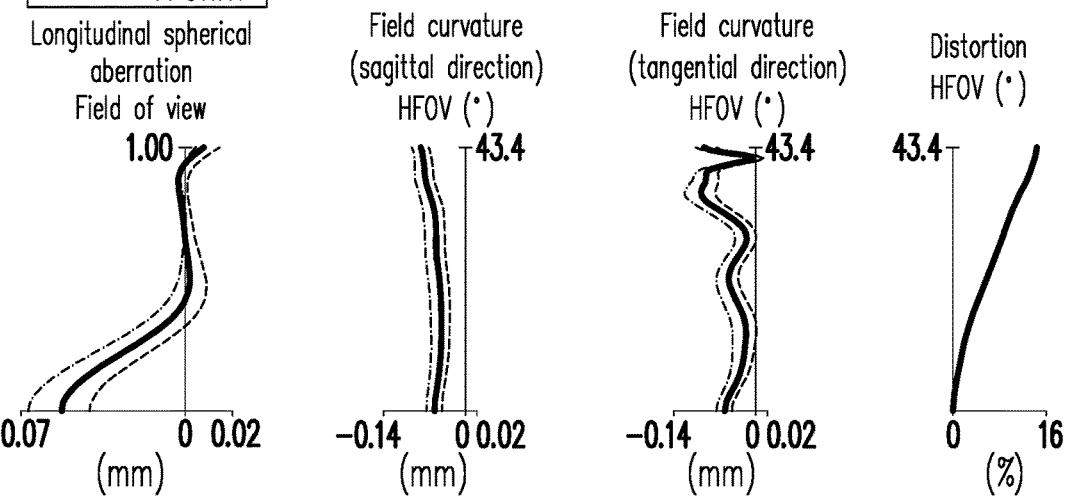
FIG. 39A to FIG. 39D are diagrams illustrating a longitudinal spherical aberration and other aberrations of the optical imaging lens according to the ninth embodiment.

The longitudinal spherical aberration of the ninth embodiment is shown in FIG. 39A, in which imaging point deviations of the off-axis rays at different heights are controlled within the range of ±0.07 mm. In the two diagrams of the field curvature aberrations as illustrated FIG. 39B and FIG. 39C, the three representative wavelengths have the focal length variation within ±0.14 mm in the entire field of view. In FIG. 39D, the diagram of distortion aberration shows that the distortion aberration in the ninth embodiment is maintained within the range of ±16%.

In view of the above description, it can be known that the system length TTL of the ninth embodiment is shorter than that of the first embodiment.

Referring to FIG. 42, FIG. 43, FIG. 44 and FIG. 45, FIG. 42, FIG. 43, FIG. 44 and FIG. 45 are table diagrams showing the optical parameters provided in the first embodiment to the ninth embodiment.

In order to effectively shorten the system length TTL of the optical imaging lens 10 and to enable the optical imaging lens 10 to have a large image height ImgH so the image sensor can receive more light and appropriately increase the optical imaging quality, the optical imaging lens 10 in the embodiments of the invention satisfies the following condition expression: $(G67+T7)/(T1+T2) \geq 1.600$, wherein a more preferable range is $1.600 \leq (G67+T7)/(T1+T2) \leq 6.100$.

For achieving the shortened system length for the lens and ensuring the imaging quality, shortening the air gaps of the lens elements or properly shortening the thicknesses of the lens elements is also one of the measures taken in the invention. Moreover, when the difficulty in the manufacturing process is further taken into consideration, if the numerical limitations in the following condition expressions can be satisfied, a more preferable configuration may also be accomplished for the optical imaging lens 10 according to the embodiments of the invention.

The optical imaging lens 10 in the embodiments of the invention further satisfies the following condition expression: $EFL/(AAG+BFL) \leq 2.000$, wherein a more preferable range is $0.800 \leq EFL/(AAG+BFL) \leq 2.000$.

The optical imaging lens 10 in the embodiments of the invention further satisfies the following condition expression: $(T5+T6+T7)/(T1+G12) \geq 1.900$, wherein a more preferable range is $1.900 \leq (T5+T6+T7)/(T1+G12) \leq 11.000$.

The optical imaging lens 10 in the embodiments of the invention further satisfies the following condition expression: $TL/AAG \geq 1.600$, wherein a more preferable range is $1.600 \leq TL/AAG \leq 3.500$.

The optical imaging lens 10 in the embodiments of the invention further satisfies the following condition expression: $TTL/BFL \leq 7.650$, wherein a more preferable range is $4.300 \leq TTL/BFL \leq 7.650$.

The optical imaging lens 10 in the embodiments of the invention further satisfies the following condition expression: $(G45+T7)/(T1+G12+T2) \geq 1.400$, wherein a more preferable range is $1.400 \leq (G45+T7)/(T1+G12+T2) \leq 4.200$.

The optical imaging lens 10 in the embodiments of the invention further satisfies the following condition expression: $ALT/(G34+G45+G56) \leq 4.500$, wherein a more preferable range is $1.000 \leq ALT/(G34+G45+G56) \leq 4.500$.

The optical imaging lens 10 in the embodiments of the invention further satisfies the following condition expression: $TL/(T2+G23+T3) \leq 7.000$, wherein a more preferable range is $4.400 \leq TL/(T2+G23+T3) \leq 7.000$.

The optical imaging lens 10 in the embodiments of the invention further satisfies the following condition expression: $(T4+G45+T5+G56+T6)/(T2+G23+T3) \leq 2.600$, wherein a more preferable range is $1.500 \leq (T4+G45+T5+G56+T6)/(T2+G23+T3) \leq 2.600$.

The optical imaging lens 10 in the embodiments of the invention further satisfies the following condition expression: $TTL/(T5+G56+T6) \leq 8.000$, wherein a more preferable range is $2.900 \leq TTL/(T5+G56+T6) \leq 8.000$.

The optical imaging lens 10 in the embodiments of the invention further satisfies the following condition expression: $(T4+G45)/(T2+T5+G56) \geq 0.900$, wherein a more preferable range is $0.900 \leq (T4+G45)/(T2+T5+G56) \leq 4.800$.

The optical imaging lens 10 in the embodiments of the invention further satisfies the following condition expression: $(EFL+BFL)/AAG \leq 4.200$, wherein a more preferable range is $1.400 \leq (EFL+BFL)/AAG \leq 4.200$.

The optical imaging lens 10 in the embodiments of the invention further satisfies the following condition expression: $(T3+G34+T4)/(T1+G12+T2) \geq 1.600$, wherein a more preferable range is $1.600 \leq (T3+G34+T4)/(T1+G12+T2) \leq 10.700$.

The optical imaging lens 10 in the embodiments of the invention further satisfies the following condition expression: $(T5+G56+T6)/(T3+G34+T4) \leq 1.000$, wherein a more preferable range is $0.300 \leq (T5+G56+T6)/(T3+G34+T4) \leq 1.000$.

The optical imaging lens 10 in the embodiments of the invention further satisfies the following condition expression: $AAG/(T6+T7) \leq 2.200$, wherein a more preferable range is $0.700 \leq AAG/(T6+T7) \leq 2.200$.

The optical imaging lens 10 in the embodiments of the invention further satisfies the following condition expression: (T5+T7)/(G12+G67)≥1.200, wherein a more preferable range is 1.200≤(T5+T7)/(G12+G67)≤6.200.

The optical imaging lens 10 in the embodiments of the invention further satisfies the following condition expression: TTL/EFL≤2.700, wherein a more preferable range is 0.700≤TTL/EFL≤2.700.

The optical imaging lens 10 in the embodiments of the invention further satisfies the following condition expression: (EFL+AAG)/ALT≥1.800, wherein a more preferable range is 1.800≤(EFL+AAG)/ALT≤6.100.

In addition, lens limitations may be further added by using any combination relation of the parameters selected from the provided embodiments to implement the design for the lens with the same framework set forth in the embodiments of the invention. Due to the unpredictability in an optical system design, with the framework set forth in the invention, if aforementioned conditions are satisfied, the optical imaging lens in the embodiments of the invention can achieve a shortened depth, an enlarged available aperture, an improved imaging quality, a reduced area ratio of the optical imaging lens placed on the camera, or an improved assembly yield so the shortcomings in the conventional art can be solved.

The aforementioned limitation relational expressions are provided in an exemplary sense and can be selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. It should be noted that the above-described details can be optionally combined and applied to the other embodiments of the invention under the condition where they are not in conflict with one another.

To sum up, the optical imaging lens 10 described in the embodiments of the invention may have at least one of the following advantages and/or achieve at least one of the following effects.

1. The longitudinal spherical aberrations, the astigmatic aberrations, and the distortion aberrations provided in the embodiments of the invention all comply with usage specifications. Moreover, the off-axis rays of the three representative wavelengths of red, green and blue at different heights are all focused near the imaging point, and the skew margin of the curve of each wavelength shows that the imaging point deviation of the off-axis rays at different heights is under control to provide the capability of suppressing spherical aberrations, image aberrations, and distortion. With further examination upon the imaging quality data, inter-distances between the three representative wavelengths of red, green and blue are fairly close, which represents that light rays with different wavelengths in the invention can be well focused under different circumstances to provide the capability of suppressing dispersion. In summary, the invention can achieve excellent image quality through design and mutual matching of the lenses.

2. In the optical imaging lens of the embodiments of the invention, by designing the periphery region of the image-side surface of the first lens element to be convex, designing the periphery region of the image-side surface of the third lens element to be concave, designing the fourth lens element to be positive refracting power, designing the optical axis region of the image-side surface of the fifth lens element to be concave and designing the optical axis region of the image-side surface of the sixth lens element to be concave, the entire optical imaging lens have good imaging quality while effectively increasing luminous flux.

3. In the optical imaging lens of the embodiments of the invention, by designing the periphery region of the image-side surface of the third lens element to be concave, designing the periphery region of the object-side surface of the fourth lens element to be concave, designing the optical axis region of the image-side surface of the fifth lens element to be concave, designing the optical axis region of the image-side surface of the sixth lens element to be concave, designing the optical axis region of the object-side surface of the seventh lens element to be convex, and then designing the fourth lens element to be positive refracting power or designing the fifth lens element to be negative refracting power, the optical imaging lens can achieve the purpose of correcting optical system aberrations and reducing distortion.

4. The design of the lens elements adopting the aspheric surface in each embodiment of the invention is more advantageous for optimizing image quality.

5. The plastic material selected and used by the lens elements in each embodiment of the invention contributes to light weight, and can reduce the weight and cost of the optical imaging lens.

All of the numerical ranges including the maximum and minimum values and the values therebetween which are obtained from the combining proportion relation of the optical parameters disclosed in each embodiment of the invention are implementable.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An optical imaging lens, comprising a first lens element, a second lens element, a third lens element, a fourth lens element, a fifth lens element, a sixth lens element and a seventh lens element sequentially along an optical axis from an object side to an image side, wherein each of the first lens element to the seventh lens element comprises an object-side surface facing toward the object side and allowing imaging rays to pass through and an image-side surface facing toward the image side and allowing the imaging rays to pass through, wherein a periphery region of the image-side surface of the first lens element is convex;

a periphery region of the image-side surface of the third lens element is concave;

the fourth lens element has positive refracting power;

an optical axis region of the image-side surface of the fifth lens element is concave;

an optical axis region of the image-side surface of the sixth lens element is concave;

the optical imaging lens includes only the first lens element to the seventh lens element as lens elements having refracting power, and satisfies the following condition expression: (G67+T7)/(T1+T2)≥1.600, wherein G67 is an air gap from the sixth lens element to the seventh lens element along the optical axis, T1 is a thickness of the first lens element along the optical axis, T2 is a thickness of the second lens element along the optical axis, and T7 is a thickness of the seventh lens element along the optical axis.

2. The optical imaging lens according to claim 1, wherein the optical imaging lens further satisfies the following condition expression: EFL/(AAG+BFL)≤2.000, wherein EFL is an effective focal length of the optical imaging lens, AAG is a sum of six air gaps of the first lens element to the seventh lens element along the optical axis, and BFL is a distance from the image-side surface of the seventh lens element to an image plane along the optical axis.

3. The optical imaging lens according to claim 1, wherein the optical imaging lens further satisfies the following condition expression: (T5+T6+T7)/(T1+G12)≥1.900, wherein T5 is a thickness of the fifth lens element along the optical axis, T6 is a thickness of the sixth lens element along the optical axis, and G12 is an air gap from the first lens element to the second lens element along the optical axis.

4. The optical imaging lens according to claim 1, wherein the optical imaging lens further satisfies the following condition expression: TL/AAG≥1.600, wherein TL is a distance from the object-side surface of the first lens element to the image-side surface of the seventh lens element along the optical axis, and AAG is a sum of six air gaps of the first lens element to the seventh lens element along the optical axis.

5. The optical imaging lens according to claim 1, wherein the optical imaging lens further satisfies the following condition expression: TTL/BFL≤7.650, wherein TTL is a distance from the object-side surface of the first lens element to an image plane along the optical axis, and BFL is a distance from the image-side surface of the seventh lens element to an image plane along the optical axis.

6. The optical imaging lens according to claim 1, wherein the optical imaging lens further satisfies the following condition expression: (G45+T7)/(T1+G12+T2)≥1.400, wherein G12 is an air gap from the first lens element to the second lens element along the optical axis, and G45 is an air gap from the fourth lens element to the fifth lens element along the optical axis.

7. The optical imaging lens according to claim 1, wherein the optical imaging lens further satisfies the following condition expression: ALT/(G34+G45+G56)≤4.500, wherein ALT is a sum of seven lens thicknesses of the first lens element to the seventh lens element along the optical axis, G34 is an air gap from the third lens element to the fourth lens element along the optical axis, G45 is an air gap from the fourth lens element to the fifth lens element along the optical axis, and G56 is an air gap from the fifth lens element to the sixth lens element along the optical axis.

8. An optical imaging lens, comprising a first lens element, a second lens element, a third lens element, a fourth lens element, a fifth lens element, a sixth lens element and a seventh lens element sequentially along an optical axis from an object side to an image side, wherein each of the first lens element to the seventh lens element comprises an object-side surface facing toward the object side and allowing imaging rays to pass through and an image-side surface facing toward the image side and allowing the imaging rays to pass through, wherein
 a periphery region of the image-side surface of the third lens element is concave;
 the fourth lens element has positive refracting power, and a periphery region of the object-side surface of the fourth lens element is concave;
 an optical axis region of the image-side surface of the fifth lens element is concave;

an optical axis region of the image-side surface of the sixth lens element is concave;
 an optical axis region of the object-side surface of the seventh lens element is convex;
 the optical imaging lens includes only the first lens element to the seventh lens element as lens elements having refracting power, and satisfies the following condition expression: (G67+T7)/(T1+T2)≥1.600, wherein G67 is an air gap from the sixth lens element to the seventh lens element along the optical axis, T1 is a thickness of the first lens element along the optical axis, T2 is a thickness of the second lens element along the optical axis, and T7 is a thickness of the seventh lens element along the optical axis.

9. The optical imaging lens according to claim 8, wherein the optical imaging lens further satisfies the following condition expression: TL/(T2+G23+T3)≤7.000, wherein TL is a distance from the object-side surface of the first lens element to the image-side surface of the seventh lens element along the optical axis, G23 is an air gap from the second lens element to the third lens element along the optical axis, and T3 is a thickness of the third lens element along the optical axis.

10. The optical imaging lens according to claim 8, wherein the optical imaging lens further satisfies the following condition expression: (T4+G45+T5+G56+T6)/(T2+G23+T3)≤2.600, wherein T3 is a thickness of the third lens element along the optical axis, T4 is a thickness of the fourth lens element along the optical axis, T5 is a thickness of the fifth lens element along the optical axis, T6 is a thickness of the sixth lens element along the optical axis, G23 is an air gap from the second lens element to the third lens element along the optical axis, G45 is an air gap from the fourth lens element to the fifth lens element along the optical axis, and G56 is an air gap from the fifth lens element to the sixth lens element along the optical axis.

11. The optical imaging lens according to claim 8, wherein the optical imaging lens further satisfies the following condition expression: TTL/(T5+G56+T6)≤8.000, wherein TTL is a distance from the object-side surface of the first lens element to an image plane along the optical axis, T5 is a thickness of the fifth lens element along the optical axis, T6 is a thickness of the sixth lens element along the optical axis, and G56 is an air gap from the fifth lens element to the sixth lens element along the optical axis.

12. The optical imaging lens according to claim 8, wherein the optical imaging lens further satisfies the following condition expression: (T4+G45)/(T2+T5+G56)≥0.900, wherein T4 is a thickness of the fourth lens element along the optical axis, T5 is a thickness of the fifth lens element along the optical axis, G45 is an air gap from the fourth lens element to the fifth lens element along the optical axis, and G56 is an air gap from the fifth lens element to the sixth lens element along the optical axis.

13. The optical imaging lens according to claim 8, wherein the optical imaging lens further satisfies the following condition expression: (EFL+BFL)/AAG≤4.200, wherein EFL is an effective focal length of the optical imaging lens, BFL is a distance from the image-side surface of the seventh lens element to an image plane along the optical axis, and AAG is a sum of six air gaps of the first lens element to the seventh lens element along the optical axis.

14. The optical imaging lens according to claim 8, wherein the optical imaging lens further satisfies the following condition expression: (T3+G34+T4)/(T1+G12+T2)≥1.600, wherein T3 is a thickness of the third lens element along the optical axis, T4 is a thickness of the fourth lens element along the optical axis, G12 is an air gap from the first lens element to the second lens element along the optical axis, and G34 is an air gap from the third lens element to the fourth lens element along the optical axis.

15. An optical imaging lens, comprising a first lens element, a second lens element, a third lens element, a fourth lens element, a fifth lens element, a sixth lens element and a seventh lens element sequentially along an optical axis from an object side to an image side, wherein each of the first lens element to the seventh lens element comprises an object-side surface facing toward the object side and allowing imaging rays to pass through and an image-side surface facing toward the image side and allowing the imaging rays to pass through, wherein
- a periphery region of the image-side surface of the third lens element is concave;
- a periphery region of the object-side surface of the fourth lens element is concave;
- the fifth lens element has negative refracting power, and an optical axis region of the image-side surface of the fifth lens element is concave;
- an optical axis region of the image-side surface of the sixth lens element is concave;
- an optical axis region of the object-side surface of the seventh lens element is convex;
- the optical imaging lens includes only the first lens element to the seventh lens element as lens elements having refracting power, and satisfies the following condition expression: $(G67+T7)/(T1+T2) \geq 1.600$, wherein G67 is an air gap from the sixth lens element to the seventh lens element along the optical axis, T1 is a thickness of the first lens element along the optical axis, T2 is a thickness of the second lens element along the optical axis, and T7 is a thickness of the seventh lens element along the optical axis.

16. The optical imaging lens according to claim 15, wherein the optical imaging lens further satisfies the following condition expression: $(T5+G56+T6)/(T3+G34+T4) \leq 1.000$, wherein T3 is a thickness of the third lens element along the optical axis, T4 is a thickness of the fourth lens element along the optical axis, T5 is a thickness of the fifth lens element along the optical axis, T6 is a thickness of the sixth lens element along the optical axis, G34 is an air gap from the third lens element to the fourth lens element along the optical axis, and G56 is an air gap from the fifth lens element to the sixth lens element along the optical axis.

17. The optical imaging lens according to claim 15, wherein the optical imaging lens further satisfies the following condition expression: $AAG/(T6+T7) \leq 2.200$, wherein AAG is a sum of six air gaps of the first lens element to the seventh lens element along the optical axis, and T6 is a thickness of the sixth lens element along the optical axis.

18. The optical imaging lens according to claim 15, wherein the optical imaging lens further satisfies the following condition expression: $(T5+T7)/(G12+G67) \geq 1.200$, wherein T5 is a thickness of the fifth lens element along the optical axis, and G12 is an air gap from the first lens element to the second lens element along the optical axis.

19. The optical imaging lens according to claim 15, wherein the optical imaging lens further satisfies the following condition expression: $TTL/EFL \leq 2.700$, wherein TTL is a distance from the object-side surface of the first lens element to an image plane along the optical axis, and EFL is an effective focal length of the optical imaging lens.

20. The optical imaging lens according to claim 15, wherein the optical imaging lens further satisfies the following condition expression: $(EFL+AAG)/ALT \geq 1.800$, wherein EFL is an effective focal length of the optical imaging lens, AAG is a sum of six air gaps of the first lens element to the seventh lens element along the optical axis, and ALT is a sum of seven lens thicknesses of the first lens element to the seventh lens element along the optical axis.

* * * * *